United States Patent
Haryani et al.

(10) Patent No.: US 10,886,860 B2
(45) Date of Patent: Jan. 5, 2021

(54) THREE-PHASE, THREE-LEVEL INVERTERS AND METHODS FOR PERFORMING SOFT SWITCHING WITH PHASE SYNCHRONIZATION

(71) Applicant: Virginia Tech Intellectual Properties, Inc., Blacksburg, VA (US)

(72) Inventors: Nidhi Haryani, Blacksburg, VA (US); Sungjae Ohn, Falls Church, VA (US); Rolando Burgos, Blacksburg, VA (US); Dushan Boroyevich, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 16/416,915

(22) Filed: May 20, 2019

(65) Prior Publication Data
US 2020/0373853 A1 Nov. 26, 2020

(51) Int. Cl.
*H02M 7/538* (2007.01)
*H02M 7/5387* (2007.01)
*H02M 1/084* (2006.01)

(52) U.S. Cl.
CPC ....... *H02M 7/53871* (2013.01); *H02M 1/084* (2013.01)

(58) Field of Classification Search
None
See application file for complete search history.

(56) References Cited

U.S. PATENT DOCUMENTS

| | | | |
|---|---|---|---|
| 5,684,688 A * | 11/1997 | Rouaud | H02M 1/34 363/132 |
| 7,495,938 B2 | 2/2009 | Wu et al. | |
| 9,979,319 B1 * | 5/2018 | Jiao | H02M 1/32 |
| 10,381,921 B1 * | 8/2019 | Haryani | H02M 7/797 |
| 2016/0191021 A1 * | 6/2016 | Zhao | H03K 17/127 327/109 |

(Continued)

OTHER PUBLICATIONS

Leuenberger, et al., "Triangular Current Mode Operation of a Three Phase Interleaved T-Type Inverter for Photovoltaic Systems," Power Conversion and Intelligent Motion Europe, May 2012.

(Continued)

*Primary Examiner* — Jeffrey A Gblende
(74) *Attorney, Agent, or Firm* — Thomas Horstemeyer, LLP

(57) ABSTRACT

A three-phase, N-level inverter and method are disclosed. A circuit topology of the inverter comprises first, second and third sets of switches and first, second and third inductors. Each switch comprises at least first, second and third terminals, the first terminals being control terminals. The first terminals of the first, second and third inductors are electrically coupled to the first, second and third sets of switches, respectively. A current controller performs a control algorithm that causes it to output first, second and third sets of gating signals to the control terminals of the switches of the first, second and third sets of switches, respectively, to cause them to be placed in an on state or an off state in a particular sequence to perform zero voltage switching while maintaining synchronization of the three phases of the three-phase, N-level inverter.

27 Claims, 18 Drawing Sheets

(56) References Cited

U.S. PATENT DOCUMENTS

2016/0254758 A1* 9/2016 Norimatsu ............ H02M 1/32
363/37
2017/0229871 A1* 8/2017 Liu ...................... H02M 7/537

OTHER PUBLICATIONS

Haryani, et al. "A Novel Soft switching ZVS, Sinusoidal Input Boundary Current Mode Control of 6-switch Three Phase 2-level Boost Rectifier for Active and Active + Reactive Power Generation," IEEE Applied Power Electronics Conference, Apr. 2018.

Haryani, et al. "ZVS Turn-on Triangular Current Mode (TCM) Control for Three Phase 2 Level Inverters with Reactive Power Control," IEEE Energy Conversion Congress & Expo, Sep. 2018.

K. Yao; et al. "A Novel Constant Frequency Quasi-CRM Control Scheme of Three phase Single-switch Boost PFC Converter," IEEE Transactions on Power Electronics, vol. 38, No. 8, pp. 6236-6244, Aug. 2017.

M. Leibl et al. "New Boundary Mode Sinusoidal Input Current Control of the VIENNA Rectifier," in IEEE 2015 Energy Conversion Congress and Exposition, 2015, pp. 201-209.

Application note—"How to Drive GaN Enhancement Mode Power Switching Transistors", GaN Systems inc., Apr. 26, 2016.

C. Marxgut et al., "Ultraflat Interleaved Triangular Current Mode (TCM) Single-Phase PFC Rectifier," IEEE Transactions on Power Electronics, vol. 29, No. 2, pp. 873-882, Feb. 2014.

K. Cai, and Z. Xu, "A novel control method of three-phase single-switch Boost power factor corrector under variable switching frequency," in Proceedings of International Conference on Power System Technology, 2002(1 ), pp. 565-569.

Zhengyang Liu et al. "Design of GaN-Based MHz Totem-Pole PFC Rectifier" IEEE Journal of emerging and selected topics in Power Electronics, vol. 4, No. 3, Sep. 2016.

* cited by examiner

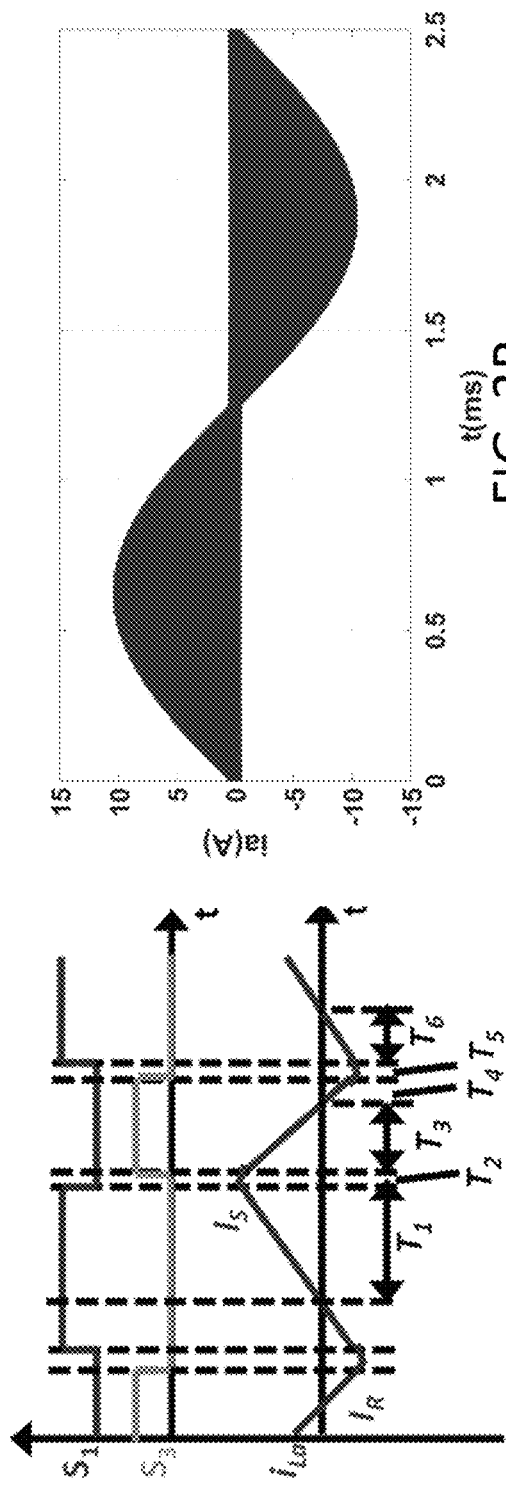
FIG. 3A (Prior Art)
FIG. 3B (Prior Art)
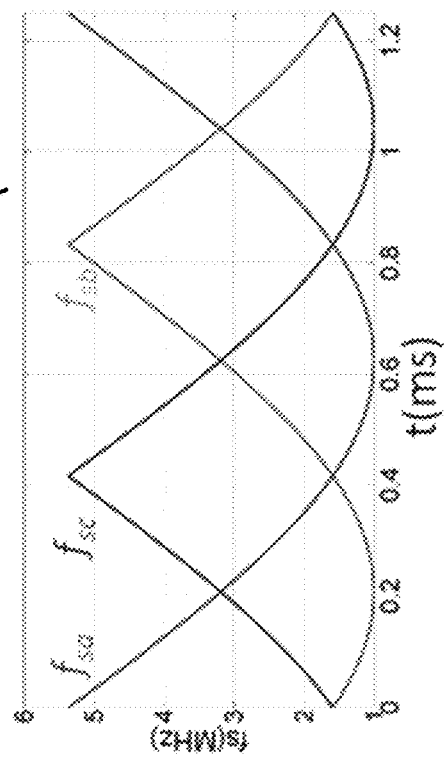
FIG. 3C (Prior Art)

Clamped to Positive Case

Clamped to Negative Case

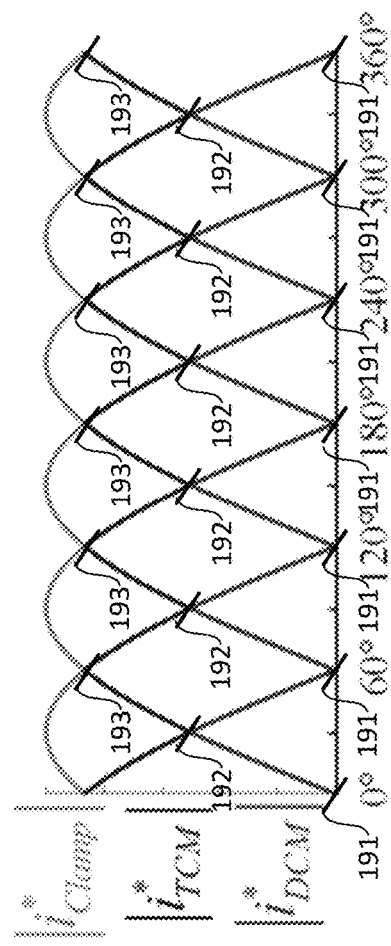
FIG. 21
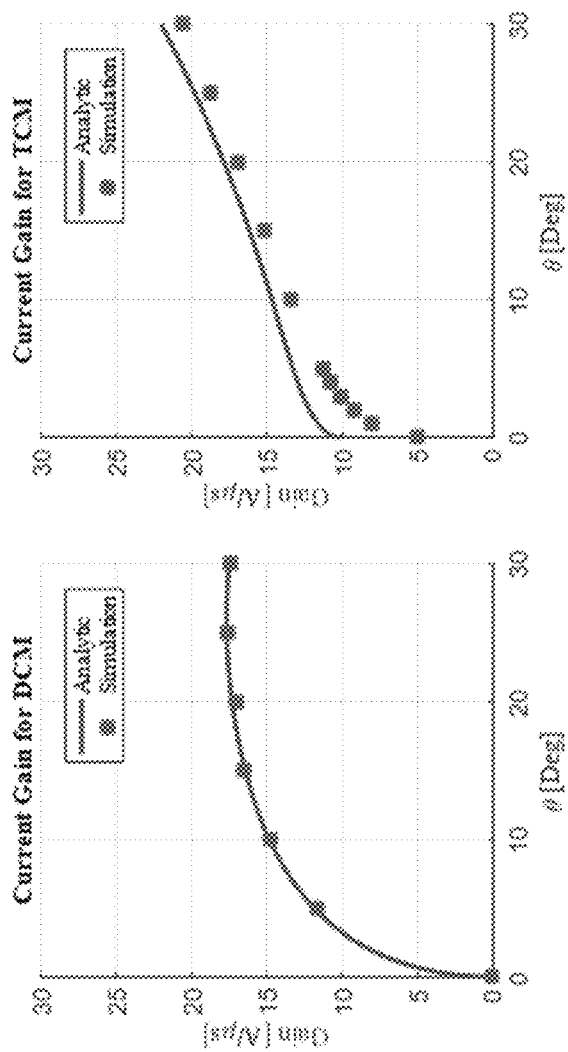
FIG. 23
FIG. 22

THREE-PHASE, THREE-LEVEL INVERTERS AND METHODS FOR PERFORMING SOFT SWITCHING WITH PHASE SYNCHRONIZATION

GOVERNMENT RIGHTS STATEMENT

This invention was made with government support under Award No. DEEE0006521 awarded by the Office of Energy Efficiency and Renewable Energy (EERE), U.S. Department of Energy. The government has certain rights in this invention.

TECHNICAL FIELD

The invention relates to three-phase, three-level inverters and switching methods associated therewith.

BACKGROUND

FIG. 1 is a schematic diagram of a known three-phase, three-level T-type inverter 2 that has twelve switches, $S_{A1}$-$S_{A4}$, $S_{B1}$-$S_{B4}$, and $S_{C1}$-$S_{C4}$ for controlling the A, B and C phases, respectively. The switching frequency of three-phase inverter systems in continuous conduction mode (CCM) is limited by the switching loss of devices. The major contribution to these switching losses is from turn-on losses, as turn-off losses of wide bandgap devices (SiC and GaN) are significantly lower. A technique known as zero voltage switching (ZVS) is used to eliminate or minimize switching losses by ensuring that the voltage across a switching transistor is zero before the transistor is turned on. In discontinuous conduction mode (DCM), the transistor can be turned on at zero current, but in general no zero voltage turn-on is present. However, if the inverter is controlled such that it always operates on the boundary of CCM and DCM, also referred to as boundary conduction mode (BCM) or critical conduction mode (CRM), it leads to lower input current harmonic distortion as compared to DCM and ZVS turn-on can also be achieved. ZVS turn-on is achieved by driving the current to a small negative value, such that it is enough to discharge the parasitic capacitors of the transistors, as is done in Triangular current mode (TCM) control. Thus, the body diode or anti-parallel diode of the transistor starts conducting before the device is turned on, hence it is necessary to have a bidirectional current in one switching cycle.

A simple way of implementing TCM in three-phase, three-level inverters is discussed in an article by D. Leuenberger and J. Biela, entitled "Triangular Current Mode Operation of a Three Phase Interleaved T-Type Inverter for Photovoltaic Systems," published in *Power Conversion and Intelligent Motion Europe* in May 2012. (hereinafter referred to as Leuenberger, et al.). FIG. 2 is a schematic diagram of one of the phase circuits 3 of a known three-phase, three-level inverter 3 proposed by Leuenberger, et al. that has the DC mid-point connected to AC neutral. The inverter can operate like three single phase inverters in parallel. Although this makes the implementation simpler, there are several problems with the design, such as desynchronized operation of three phases, a high switching frequency variation, non-availability of AC neutral connection and a limited modulation index.

FIG. 3A shows the switching cycle waveforms and inductor current waveform during one switching cycle of a three-phase, three-level inverter in accordance with the approach proposed by Leuenberger, et al. for TCM control with the DC mid-point connected to neutral. Each phase operates as an independent single phase inverter. As the switching frequency ($f_s$) is much greater than line frequency ($f_l$), the AC voltages are assumed to be constant for one switching cycle. It can be seen in FIG. 3A that the main switch, Si, is turned on after the current, $I_R$, reaches a negative value to achieve ZVS turn-on. The peak current is controlled by the average current requirement, thus the switching frequency varies during the line cycle. The simulated current is shown in FIG. 3B. All three of the phases operate at different switching frequencies, as shown in FIG. 3C.

SUMMARY

The present disclosure discloses a three-phase, N-level inverter, where N is a positive integer that is greater than or equal to two, a method for controlling switching of a three-phase, N-level inverter, and a computer program comprising instructions embedded on a non-transitory computer-readable medium for controlling a current controller of a three-phase, N-level inverter the three-phase, N-level inverter.

The three-phase, N-level inverter comprises a circuit topology and a current controller. The circuit topology comprises first, second and third sets of switches and first, second and third inductors. Each switch comprises at least first, second and third terminals, the first terminals being control terminals. Each inductor comprising at least first and second terminals, the first terminals of the first, second and third inductors being electrically coupled to the first, second and third sets of switches, respectively. The current controller is electrically coupled to the control terminals of the switches and is configured to perform a control algorithm that causes the current controller to output first, second and third sets of gating signals to the control terminals of the switches of the first, second and third sets of switches, respectively, to cause the switches to be placed in an on state or an off state in a particular sequence to perform zero voltage switching of the switches while maintaining synchronization of the three phases of the three-phase, N-level inverter.

In accordance with one aspect of the three-phase, N-level inverter, it has a maximum common mode voltage (CMV) of $V_{DC}/3$, where $V_{DC}$ is a direct current (DC) input voltage of the three-phase, three-level inverter.

In accordance with another aspect of the three-phase, N-level inverter of claim 1, wherein N is greater than or equal to three.

In accordance with another aspect of the three-phase, N-level inverter, the particular sequence is such that the switches electrically connect the first terminals of the first, second and third inductors to one of a positive (P) side of a direct current (DC) bus of the three-phase, N-level inverter, a negative (N) side of the DC bus, and a mid-point (O) of the DC bus. The particular sequence is such that the first terminals of the first, second and third inductors are never all simultaneously electrically connected by the switches to the P side of the DC bus or to the N side of the DC bus.

In accordance with another aspect of the three-phase, the three-phase, N-level inverter, the three-phase, N-level inverter circuit topology is a neutral point clamped (NPC) circuit topology.

In accordance with another aspect of the three-phase, three-phase, N-level inverter, the three-phase, N-level inverter circuit topology is a T-type circuit topology.

In accordance with another aspect of the three-phase, N-level inverter, the particular sequence is such that each of the three phases is placed in one of a discontinuous conduction mode (DCM), a triangular current conduction mode (TCM), a clamped-to-positive conduction mode (Cl. T P) and a clamped-to-negative conduction mode (Cl. T N) during each sector of a plurality of sectors that comprise a switching cycle.

In accordance with an aspect of the method for controlling switching of a three-phase, N-level inverter, the method comprising:

with a current controller, performing a control algorithm that controls switching of a plurality of switches of a three-phase, N-level inverter circuit topology comprising first, second and third sets of switches and first, second and third inductors. Each switch comprises at least first, second and third terminals, the first terminals being control terminals. Each inductor comprises at least first and second terminals. The first terminals of the first, second and third inductors are electrically coupled to the first, second and third sets of switches, respectively. The current controller is electrically coupled to the control terminals of the switches; and with the current controller performing the control algorithm, outputting first, second and third sets of gating signals to the control terminals of the switches of the first, second and third sets of switches, respectively, to cause the switches to be placed in an on state or an off state in a particular sequence to perform zero voltage switching of the switches while maintaining synchronization of the three phases of the three-phase, N-level inverter.

In accordance with an aspect of the method, the three-phase, three-level inverter has a maximum CMV of $V_{DC}/3$, where $V_{DC}$ is a DC input voltage of the three-phase, three-level inverter.

In accordance with another aspect of the method, N is equal to three.

In accordance with another aspect of the method, the particular sequence is such that the switches electrically connect the first terminals of the first, second and third inductors to one of a positive (P) side of a direct current (DC) bus of the three-phase, three-level inverter, a negative (N) side of the DC bus, and a mid-point (O) of the DC bus, and wherein the particular sequence is such that the first terminals of the first, second and third inductors are never all simultaneously electrically connected by the switches to the P side of the DC bus or to the N side of the DC bus.

In accordance with another aspect of the method, the three-phase, three-level inverter circuit topology is a NPC circuit topology.

In accordance with another aspect of the method, the three-phase, three-level inverter circuit topology is a T-type circuit topology.

In accordance with another aspect of the method, the particular sequence is such that each of the three phases is placed in one of a DCM mode, a TCM mode, a Cl. T P mode and a Cl. T N mode during each sector of a plurality of sectors that comprise a switching cycle.

In accordance with an aspect of the computer program, the program comprises first and second code segments. The first code segment determines which of a plurality of conduction modes to place each of the three phases in based on a comparison of values of first, second and third currents associated with first, second and third phases, respectively, of the three-phase, N-level inverter and based on a polarity of a clamped phase current. The three-phase, N-level inverter has a circuit topology comprising first, second and third sets of said switches and first, second and third inductors, each switch comprising at least first, second and third terminals. The first terminals of the switches are control terminals. Each inductor comprises at least first and second terminals. The first terminals of the first, second and third inductors are electrically coupled to the first, second and third sets of switches, respectively. The current controller is electrically coupled to the control terminals of the switches. The second code segment causes first, second and third sets of gating signals to be sent to the control terminals of the switches of the first, second and third sets of switches, respectively, to cause the switches to be placed in an on state or an off state in a particular sequence to perform zero voltage switching of the switches while maintaining synchronization of the three phases of the three-phase, N-level inverter.

In accordance with another aspect of the computer program, N is equal to three, and the particular sequence is such that the switches electrically connect the first terminals of the first, second and third inductors to one of a positive (P) side of a DC bus of the three-phase, N-level inverter, a negative (N) side of the DC bus, and a mid-point (O) of the DC bus. The particular sequence is such that the first terminals of the first, second and third inductors are never all simultaneously electrically connected by the switches to the P side of the DC bus or to the N side of the DC bus.

In accordance with another aspect of the computer program, the particular sequence is such that each of the three phases is placed in one of a DCM, a TCM, a Cl. T P and a Cl. T N during each sector of a plurality of sectors that comprise a switching cycle.

In accordance with another aspect of the computer program, the three-phase, three-level inverter has a maximum CMV of $V_{DC}/3$, where $V_{DC}$ is a DC input voltage of the three-phase, three-level inverter.

In accordance with another aspect of the computer program, N is greater than or equal to three.

In accordance with another aspect of the computer program, the three-phase, N-level inverter circuit topology is one of a NPC circuit topology and a T-type circuit topology.

These and other features, aspects and advantages will become apparent from the following description, drawings and claims.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 3A shows one switching cycle waveform for TCM control for a known three-phase, three-level inverter having a DC mid-point connected to neutral. This simplifies the system operation to three decoupled single phase inverters running in parallel.

FIG. 3B shows a line-cycle waveform comprising many switching cycles of the known three-phase, three-level inverter having the switching cycle shown in FIG. 3A.

FIG. 3C shows the switching frequency variation for the three phases along half line cycle for the known three-phase, three-level inverter having the switching cycle shown in FIG. 3A with the three phases operating at different switching frequencies at the same time.

FIG. 21 shows the time-domain waveforms $|i_{Clamp}*|$, $|i_{TCM}*|$, and $|i_{DCM}*|$ for one line-cycle under a unit power factor case.

FIG. 22 is a graph showing gain determined analytically and by simulation as a function of angle for the DCM conduction mode.

FIG. 23 is a graph showing gain determined analytically and by simulation as a function of angle for the TCM conduction mode.

DETAILED DESCRIPTION

Figure 1:
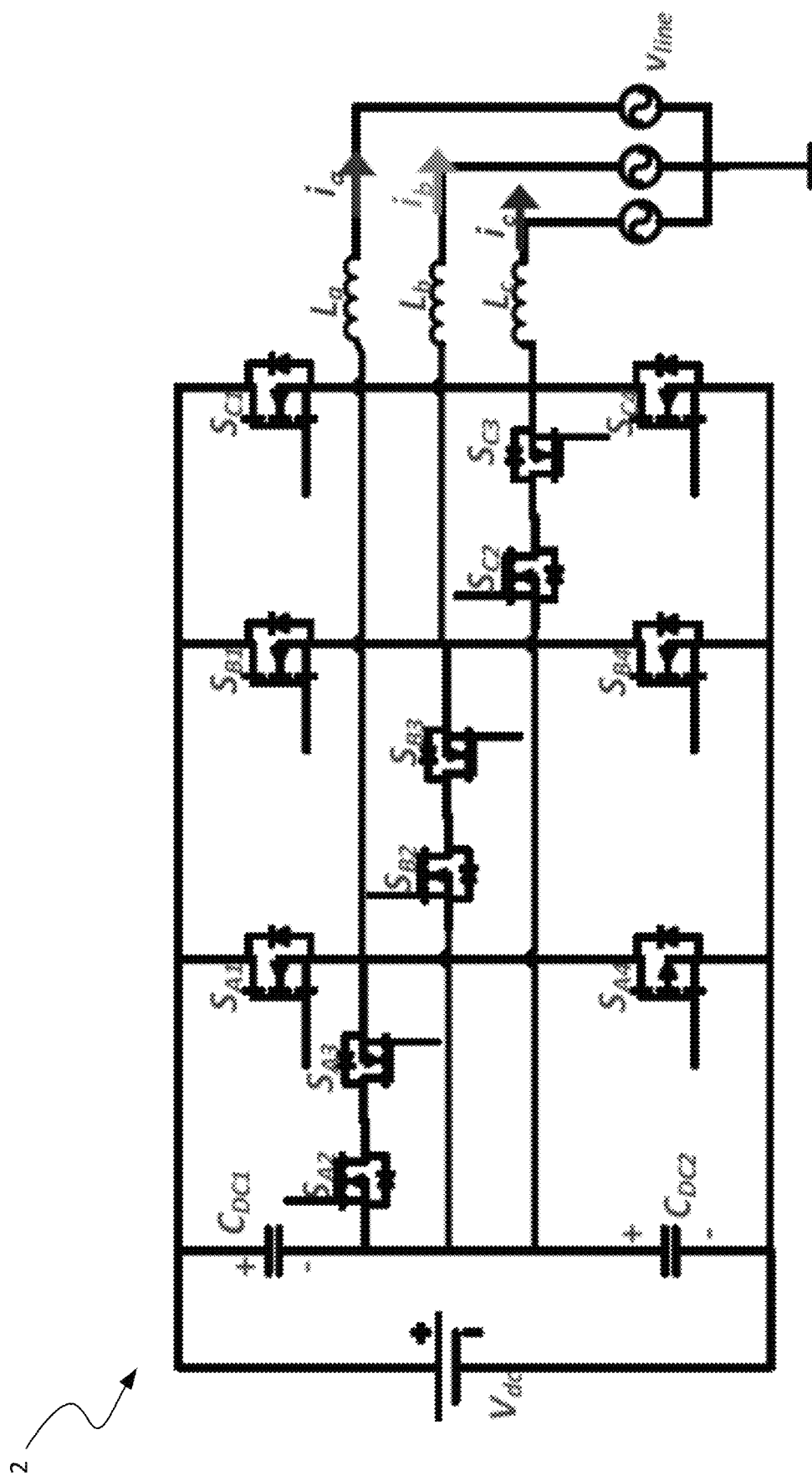
FIG. 1 is a schematic diagram of a known three-phase, three-level T-type inverter that has twelve switches, $S_{A1}$-$S_{A4}$, $S_{B1}$-$S_{B4}$, and $S_{C1}$-$S_{C4}$ for controlling the A, B and C phases, respectively.
Figure 2:
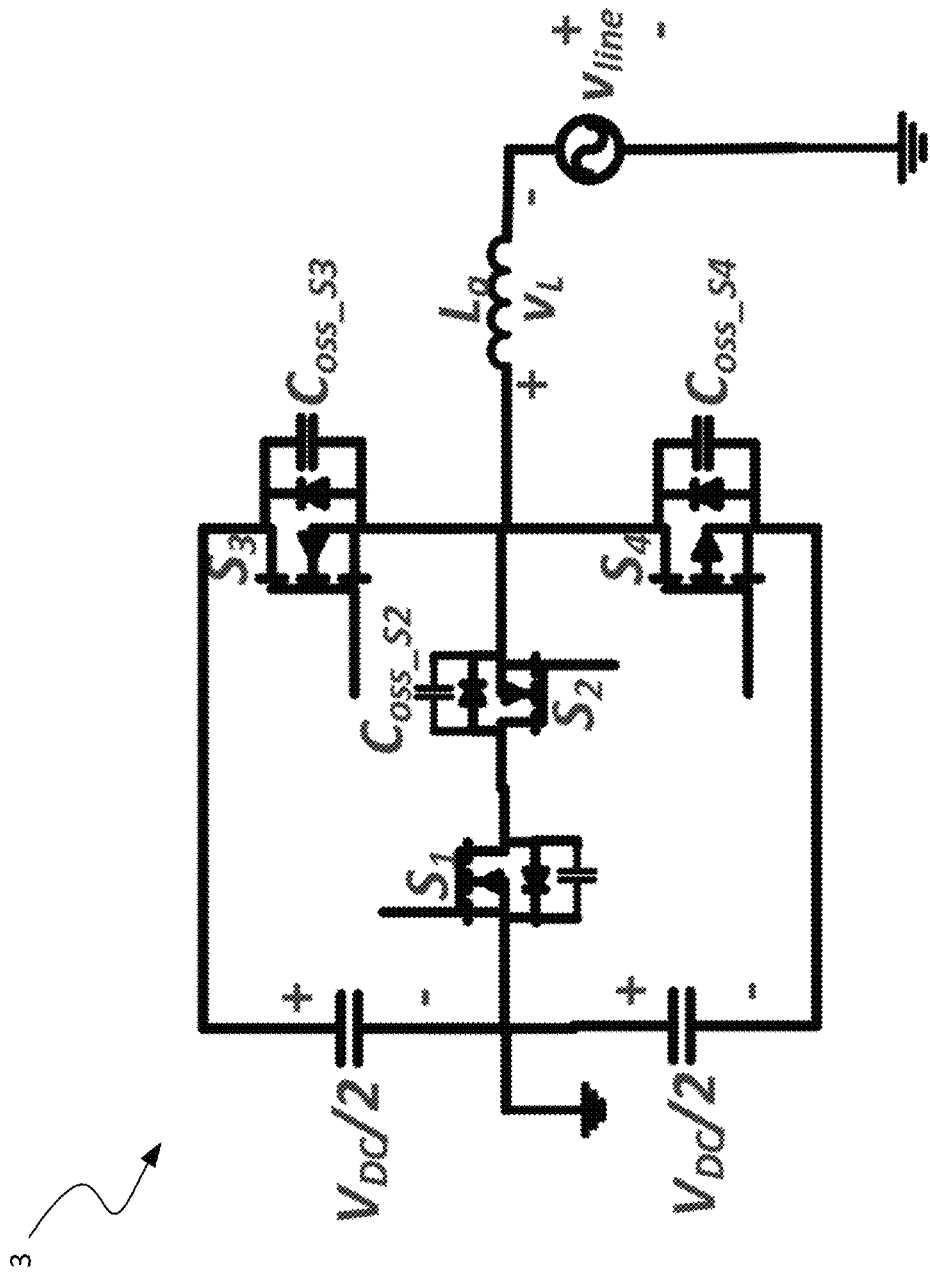
FIG. 2 is a schematic diagram of one of the phase circuits of a known three-phase, three-level inverter proposed by Leuenberger, et al.

The above-mentioned problems of the design proposed by Leuenberger, et al. have been addressed by some of the inventors of the present application, N. Haryani, B. Sun, R. Burgos, in an article entitled "A Novel Soft switching ZVS, Sinusoidal Input Boundary Current Mode Control of 6-switch Three Phase 2-level Boost Rectifier for Active and Active+Reactive Power Generation," published in IEEE Applied Power Electronics Conference, April 2018, (referred to hereinafter as "Article 1") and in an article entitled "ZVS Turn-on Triangular Current Mode (TCM) Control for Three Phase 2 Level Inverters with Reactive Power Control," IEEE Energy Conversion Congress & Expo, September 2018 (referred to hereinafter as "Article 2"). Articles 1 and 2 provide solutions to the problems of the design proposed by Leuenberger, et al. for a 2-level converter and present a sinusoidal input current TCM control method with phase synchronization for a three-phase, two-level, six-switch boost converter. Subject matter of Articles 1 and 2 is disclosed in U.S. nonprovisional application Ser. No. 16/053,378, filed on Aug. 22, 2018 and entitled "SOFT-SWITCHING TRIANGULAR CURRENT MODE CONTROL FOR THREE PHASE TWO-LEVEL CONVERTERS WITH POWER FACTOR CONTROL," which is assigned to the assignee of the present application and which is hereby incorporated by reference herein in its entirety.

The present disclosure extends the principles disclosed in Articles 1 and 2 to achieve ZVS turn-on and TCM control in three-phase, three-level inverters with phase synchronization, only small switching frequency variation, sinusoidal average currents, and low common mode voltage (CMV). However, the control algorithm disclosed here can work with three-phase, N-level inverters, where N is a positive integer that is greater than or equal to two. The inverter comprises a three-phase, N-level inverter circuit topology comprising first, second and third sets of switches and first, second and third inductors. Each switch comprises at least first, second and third terminals, the first terminals being control terminals. Each inductor comprises at least first, second and third terminals. The first terminals of the first, second and third inductors are electrically coupled to the first, second and third sets of switches, respectively. A current controller of the inverter is electrically coupled to the control terminals of the switches and is configured to perform a control algorithm that causes the current controller to output first, second and third sets of gating signals to the control terminals of the switches of the first, second and third sets of switches, respectively, to cause the switches to be placed in an on state or an off state in a particular sequence to perform zero voltage switching of the switches while maintaining synchronization of the three phases of the three-phase, N-level inverter.

In the following detailed description, a few illustrative, or representative, embodiments are described to demonstrate the inventive principles and concepts. For purposes of explanation and not limitation, representative embodiments disclosing specific details are set forth in order to provide a thorough understanding of an embodiment according to the present disclosure. However, it will be apparent to one having ordinary skill in the art having the benefit of the present disclosure that other embodiments that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor," "processing logic," or "controller," as those terms are used herein, encompass an electronic component that is able to execute a computer program, portions of a computer program or computer instructions and that is implemented in hardware, software or firmware, or a combination thereof. References herein to a computer comprising "a processor," "processing logic," or a "controller" should be interpreted as a computer having one or more processors, processing cores. Or controllers. The processor or controller may, for instance, be a multi-core processor or controller. A processor or controller may also refer to a collection of processors or controllers within a single computer system or distributed amongst multiple computer systems.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

The method for TCM control with phase synchronization discussed in Article 2 will be discussed with reference to a three phase, two-level inverter and FIGS. 4A-5B. After discussing the method and the three-phase, two-level inverter disclosed in Article 2, the manner in which that method is extended in accordance with the inventive principles and concepts disclosed herein to provide a ZVS turn-on, TCM control with phase synchronization in three-phase, three-level inverters having low CMVs will be described with reference to FIGS. 6-28.

Figure 4A:
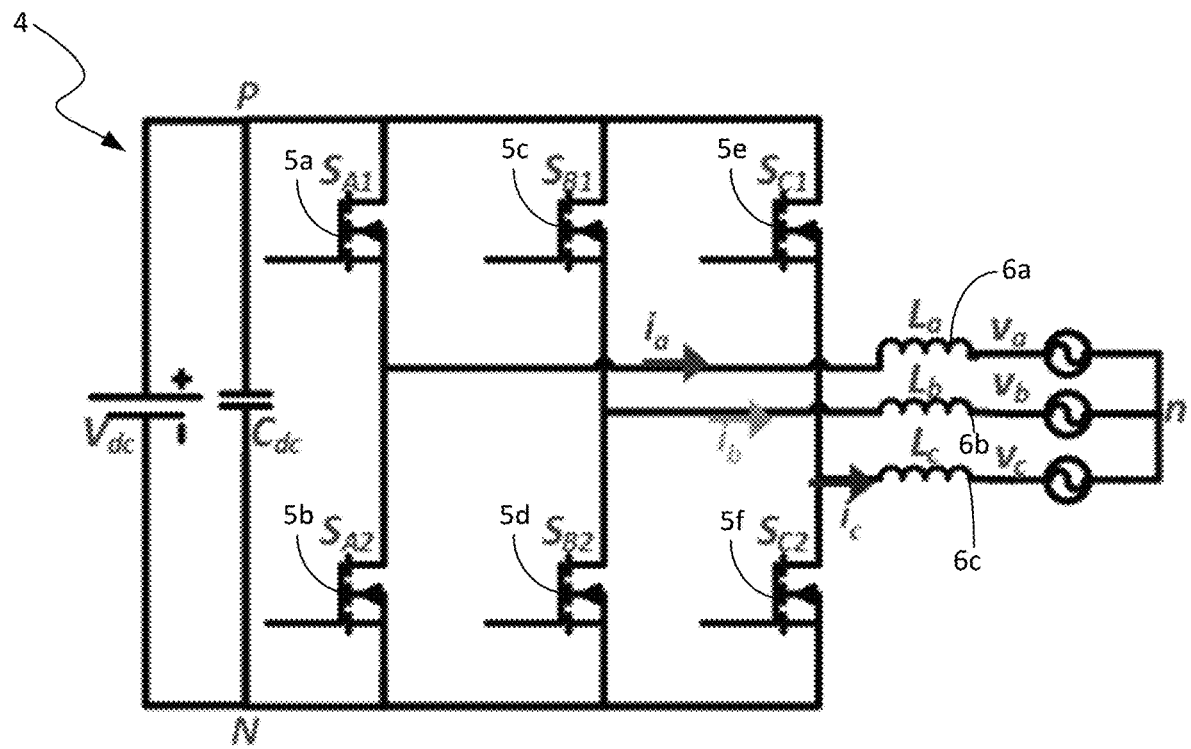
FIG. 4A is a schematic circuit diagram of a three-phase, two-level inverter.
Figure 4B:
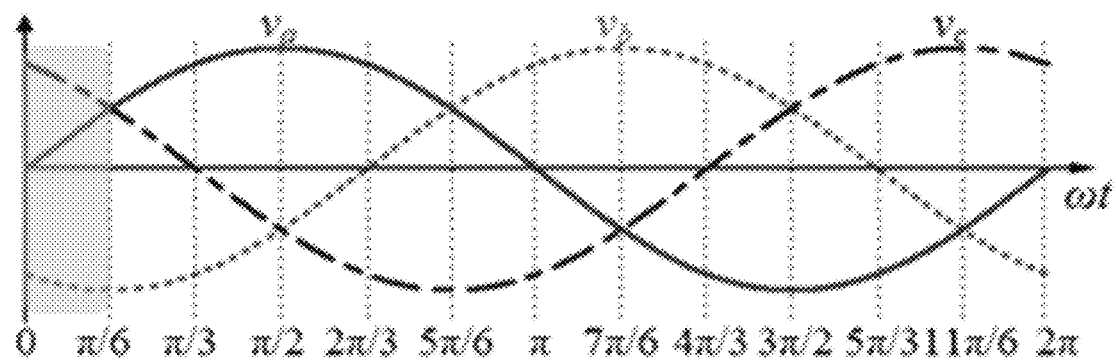
FIG. 4B shows the line cycle of the three-phase, two-level inverter shown in FIG. 2A divided into twelve sectors.

The method of Leuenberger, et al. to achieve ZVS turn-on results in desynchronized operation in all three phases. To address this problem, Article 2 presents a modulation method with phase synchronization and low switching frequency variation for a three-phase, two-level inverter. FIG. 4A is a schematic circuit diagram of the three-phase, two-level inverter 4 presented in Article 2. The inverter 4 has six switches 5a-5f and three line inductors $L_a$ 6a, $L_b$ 6b and $L_c$ 6c. FIG. 4B shows the line cycle of the three-phase, two-level inverter 4 shown in FIG. 4A divided into twelve sectors. In order to understand the overall switching sequence, it is sufficient to understand the switching sequence in one sector because the switching sequence is similar in all the sectors. Therefore, for ease of discussion and illustration, the switching sequence is described only with reference to the highlighted sector in FIG. 4B, which is referred to hereinafter as Sector I.

Figure 5B:
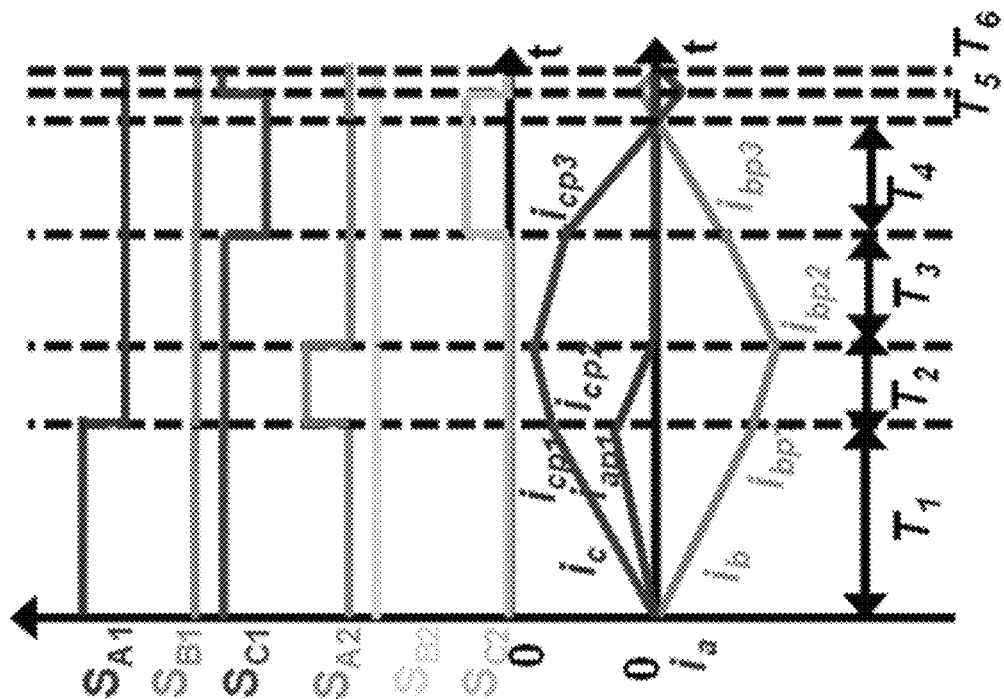
FIG. 5B shows the switching sequence of the three-phase, two-level inverter shown in FIG. 4A for the first sector in accordance with a second switching method in which DCM phase is given no delay at the beginning of a switching cycle.
Figure 5A:
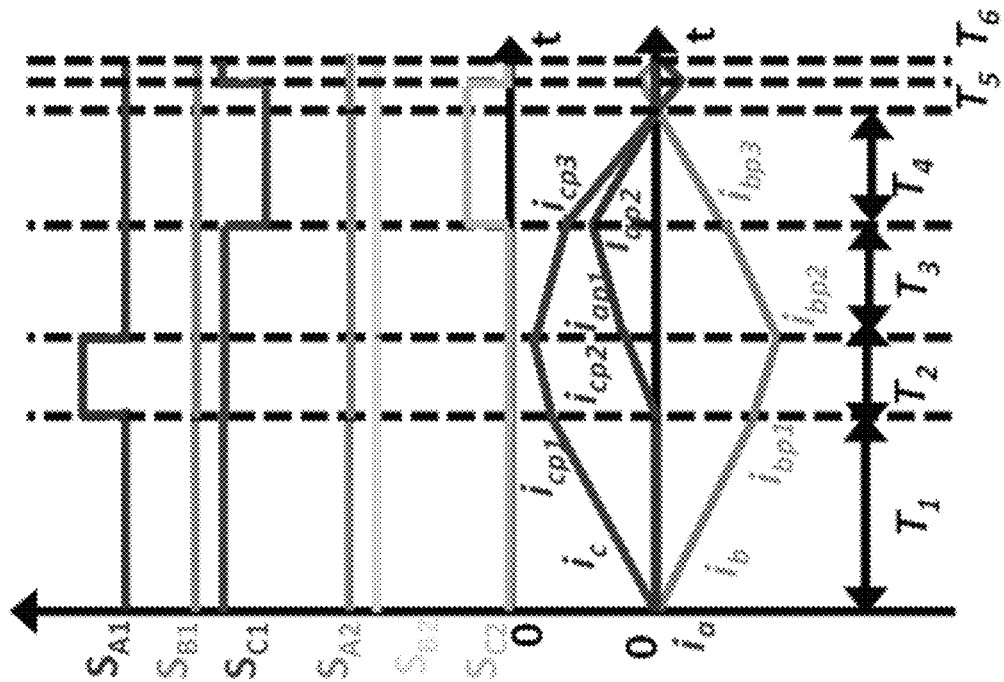
FIG. 5A shows the switching sequence of the three-phase, two-level inverter shown in FIG. 2A for a first sector of the switching cycle in accordance with a first switching method in which DCM phase is given a delay at the beginning of a switching cycle.

FIG. 5A shows the switching sequence of the three-phase, two-level inverter 4 presented in Article 2 and shown in FIG. 4A for Sector I in accordance with a first switching method in which DCM phase is given a delay at the beginning of a switching cycle. FIG. 5B shows the switching sequence of the three-phase, two-level inverter 4 presented in Article 2 and shown in FIG. 4A for Sector I in accordance with a second switching method in which DCM phase is given no delay at the beginning of a switching cycle. Assuming the AC voltages are constant for one switching cycle ($f_s \gg f_l$), the current ripple shape is triangular, as shown in FIGS. 5A and 5B. A combination of TCM mode, DCM mode and Clamped mode operation for the three phases results in phase synchronization. One switching cycle for the two-level inverter is shown in FIGS. 5A and 5B. In Sector I, C phase operates in TCM mode, A phase operates in DCM mode and B phase is clamped. The basic principle of operation is that the body diode, or anti-parallel diode, of the switching transistor of the respective switch 5a-5f should start conducting before the respective switching transistor is turned on, thus achieving ZVS turn-on.

After $S_{C2}$ is turned off, $V_{dsC1}$ reaches zero due to the small negative current ($I_R$) discharging the capacitor across $S_{C1}$ and then $S_{C1}$ is turned on at zero voltage. In FIG. 5A, it appears that $S_{C1}$ is turned on simultaneously with Su being turned off, but there very small delay between the instant in time when Su is turned off and the instant in time when $S_{C1}$ is turned on. Peak currents for all phases have to be controlled such that the average currents remain sinusoidal. The phase A current drops down to zero first as phase A has the minimum voltage magnitude in Sector I.

As shown above, ZVS turn-on can be achieved for a two-level inverter without adding any extra resonant components. This same principle is extended to a three-level inverter in accordance with the inventive principles and concepts disclosed herein. The modulation scheme discussed above can be directly implemented in a three-phase, three-level inverter, but with an additional advantage associated with of the three-level topology of a reduced CMV. This advantage of three-level topology is made use of in the modulation scheme of the present disclosure. CMV ($v_{CM}$) is defined as:

$$v_{CM} = \frac{(S_a + S_b + S_c)}{3} \frac{V_{dc}}{2} \quad (1)$$

where $$S_i = \begin{bmatrix} 1 \text{ for } P \\ 0 \text{ for } O \\ -1 \text{ for } N \end{bmatrix} \quad (2)$$

Figure 8:
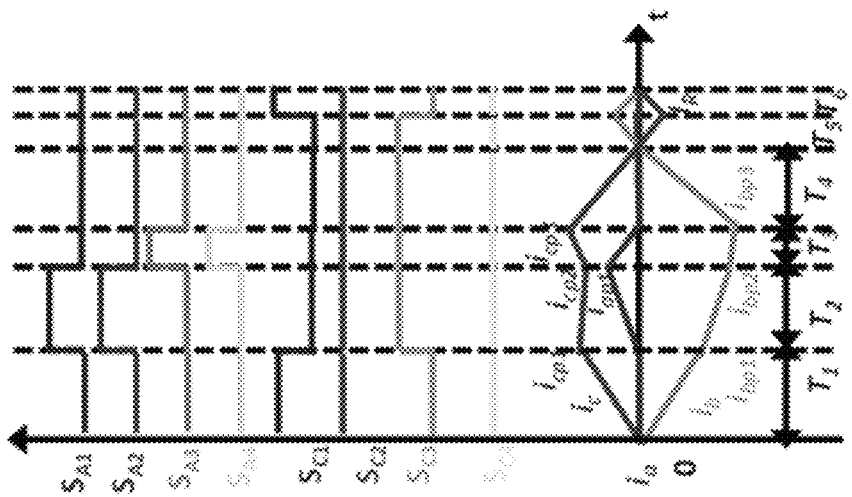
FIG. 8 shows gating signals in a three-phase, three-level inverter for one switching cycle in Sector I for the first switching method in accordance with a representative embodiment.
Figure 7:
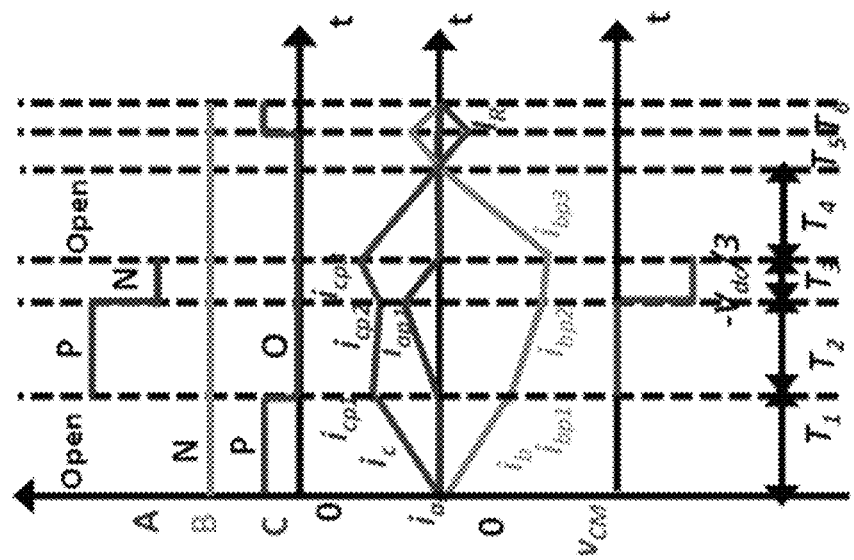
FIG. 7 shows the switching sequence and CMV for a three-phase, three-level inverter in accordance with a representative embodiment for the first switching method.
Figure 6:
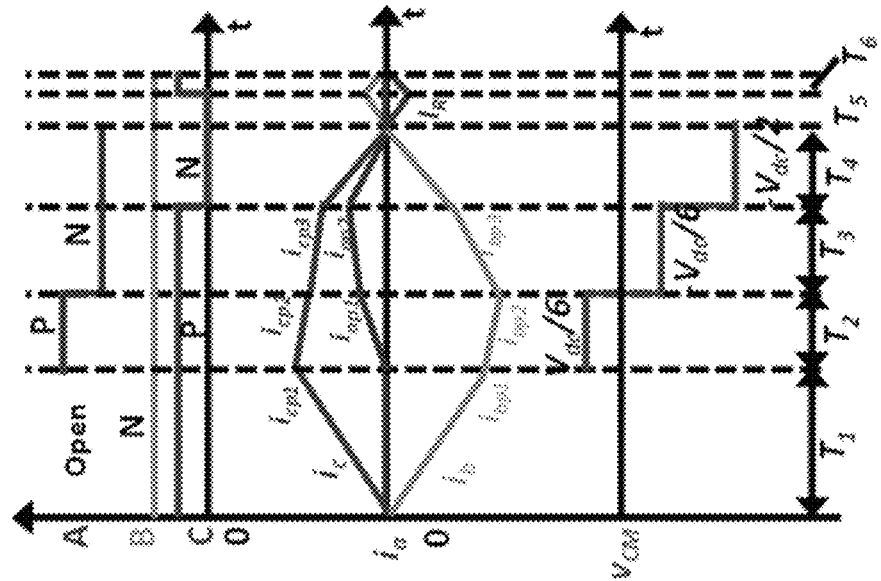
FIG. 6 shows the switching sequence and common mode voltage (CMV) for the three-phase, two-level inverter shown in FIG. 4A for the first switching method depicted in FIG. 5A.
Figure 11:
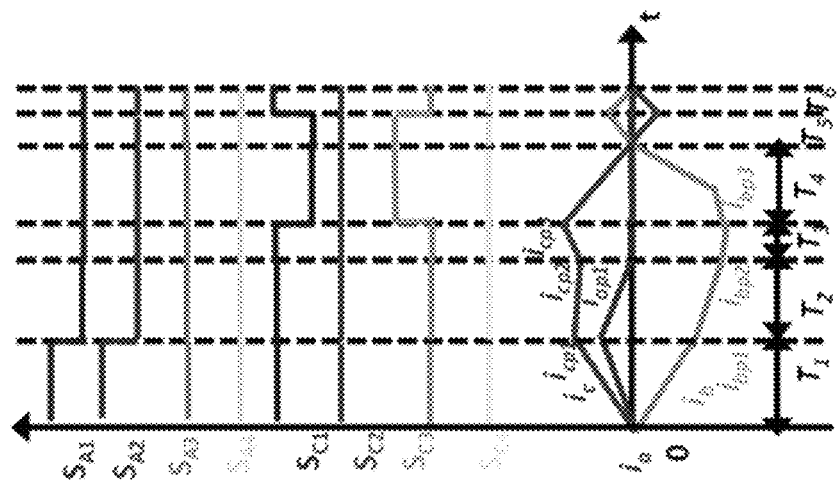
FIG. 11 shows gating signals in the three-phase, three-level inverter for one switching cycle in Sector I for the second switching method in accordance with a representative embodiment.
Figure 10:
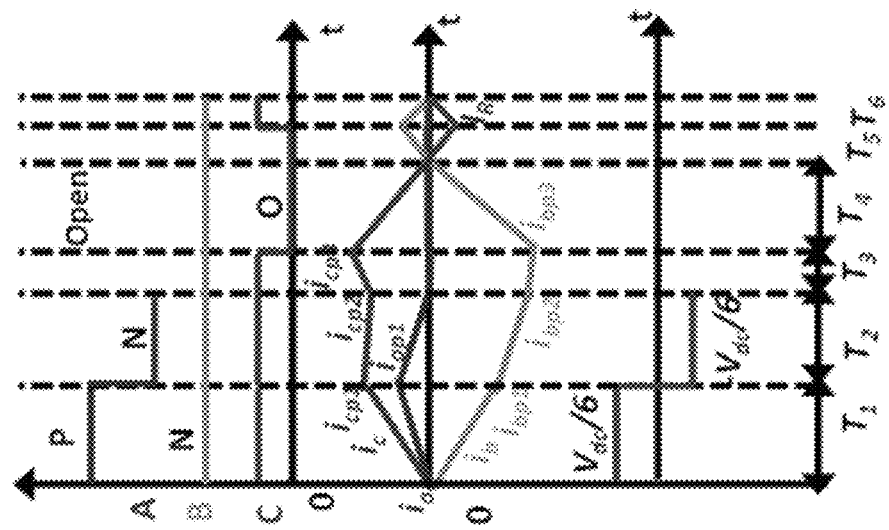
FIG. 10 shows the switching sequence and CMV for the three-phase, three-level inverter in accordance with a representative embodiment for the second switching method.
Figure 9:
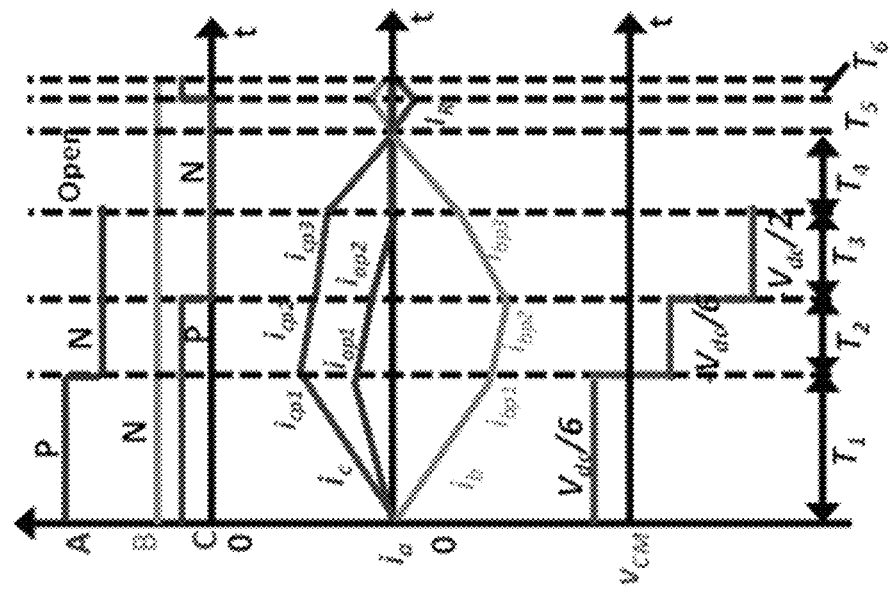
FIG. 9 shows the switching sequence and CMV for the three-phase, two-level inverter shown in FIG. 4A for the second switching method.
Figure 12:
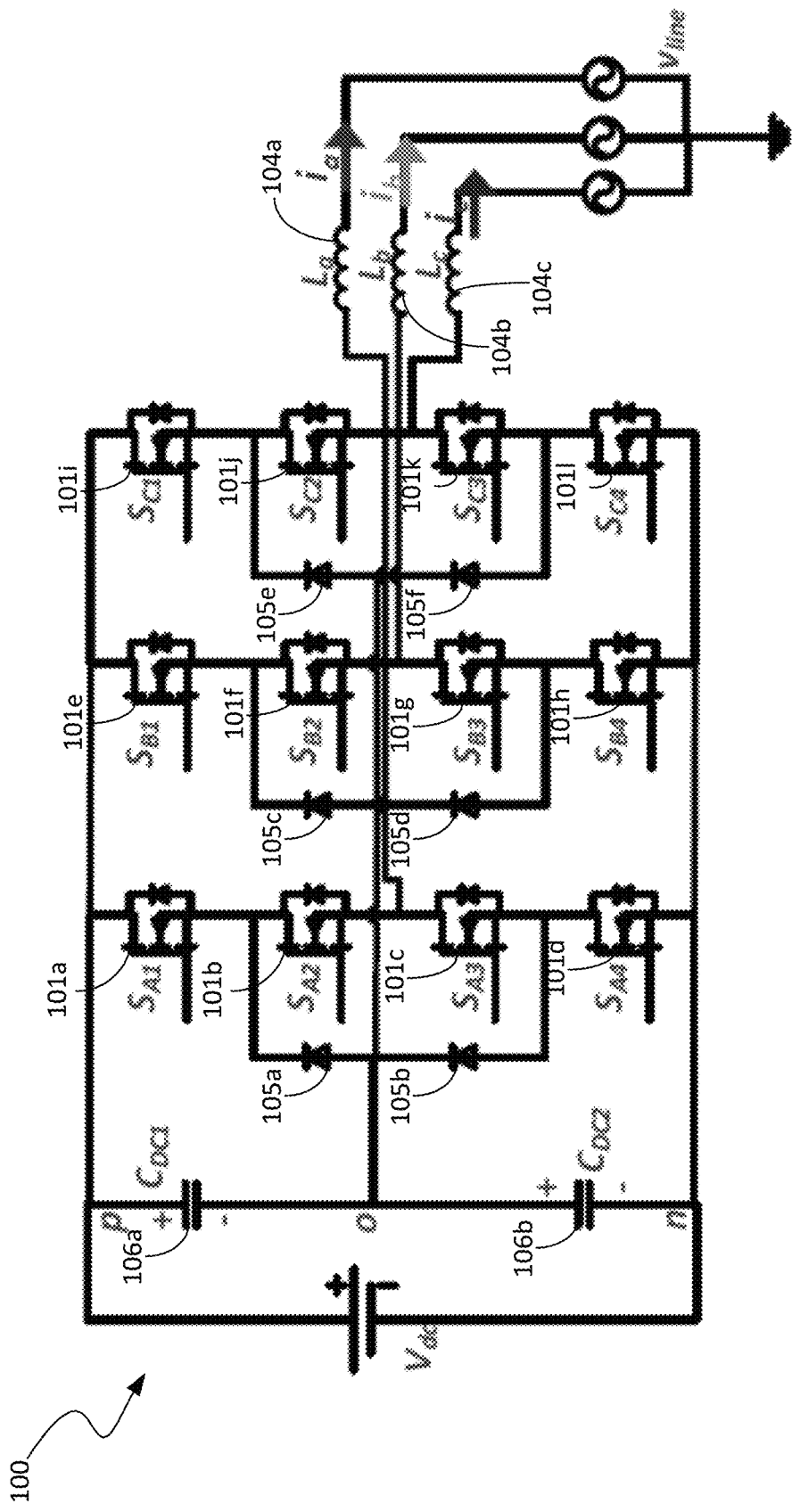
FIG. 12 shows a schematic diagram of a three-phase, three-level inverter in accordance with a representative embodiment that can implement the first and second switching methods shown in FIGS. 7, 8, 10 and 11.

FIG. 6 shows the switching sequence and CMV for the three-phase, two-level inverter 4 presented in Article 2 and shown in FIG. 4A for the first switching method depicted in FIG. 5A. FIG. 7 shows the switching sequence and CMV for the three-phase, three-level inverter in accordance with a representative embodiment for the first switching method. FIG. 8 shows gating signals in the three-phase, three-level inverter for one switching cycle in Sector I for the first switching method in accordance with a representative embodiment. FIG. 9 shows the switching sequence and CMV for the three-phase, two-level inverter 4 presented in Article 2 and shown in FIG. 4A for the second switching method. FIG. 10 shows the switching sequence and CMV for the three-phase, three-level inverter in accordance with a representative embodiment for the second switching method. FIG. 11 shows gating signals in the three-phase, three-level inverter for one switching cycle in Sector I for the second switching method in accordance with a representative embodiment. FIG. 12 shows a schematic diagram of the three-phase, three-level inverter 100 in accordance with a representative embodiment that can implement the first and second switching methods. The three-phase, three-level inverter 100 has twelve switches 101a-101l, six diodes 105a-105f, three inductors 104a-104c, and two capacitors 106a and 106b connected as shown in FIG. 12. Each of the switches 101a-101l is typically a metal oxide semiconductor field effect transistor (MOSFET), although other types of transistors could be used for this purpose. The three-phase, three-level inverter 2 shown in FIG. 1 and described above also comprises twelve switches, but does include the six diodes 105a-105f shown in FIG. 12.

The "P" in FIGS. 6, 7, 9 and 10 represents the positive DC bus point designated by "P" in FIGS. 4A and 12 and the "N" represents the negative DC bus point designated by "N" in FIGS. 4A and 12. The "O" in FIGS. 7 and 9 for the three-phase, three-level inverter shown in FIG. 12 represents the DC bus mid-point designated "O" in FIG. 12. In Eq. (2) above, Si represents the point to which each phase is connected in a switching state.

The switching states and CMV in one switching cycle of the above modulation for the three-phase, two-level inverter 4 presented in Article 2 and shown in FIG. 4A are shown in FIGS. 6 and 9. It can be seen from FIGS. 6 and 9 that the switching state N-N-N has the highest CMV ($-V_{dc}/2$). This knowledge of the desirability of avoiding connecting all three phases simultaneously to the N state or to the P state is extended to three-level modulation used for the three-phase, three-level inverter. The preferred switching sequences and the associated CMV for the modulation in Sector I for the three-phase, three-level inverter 100 shown in FIG. 12 are shown in FIGS. 7 and 10 for switching methods one and two, respectively. It can be seen in FIGS. 7 and 10 that the N-N-N state is not used and hence the highest CMV magnitude is reduced to $V_{dc}/3$ (FIG. 7) from $V_c/2$ (FIGS. 6 and 9) in both the first and second switching methods while still achieving ZVS turn-on. Thus, CMV and losses are comparable and lower than CCM for the first and second switching methods, making both methods good candidates for the three-level TCM algorithm disclosed herein and discussed below in detail.

The gating signals for one switching cycle for the first and second switching methods are shown in FIGS. 8 and 11, respectively. In FIG. 8, at the end of time $T_1$, switch $S_{C1}$ 101i (FIG. 12) is turned off, $V_{dsC3}$ drops down to zero due to the resonance between inductor and parasitic capacitors of $S_{C3}$ and $S_{C1}$ 101k (FIG. 12) and $S_{C3}$ 101k is turned on at 0 V. Similarly, at the end of $T_5$, $S_{C1}$ 101i is turned on at 0 V as the negative current $I_R$ discharges the parasitic capacitor of $S_{C1}$ 101i. A similar approach is followed in the second method. Thus, to achieve ZVS, a negative current $I_R$ is required such that the body diode, or anti-parallel diode, of $S_{C1}$ 101i starts conducting before the device is turned on.

Figure 13:
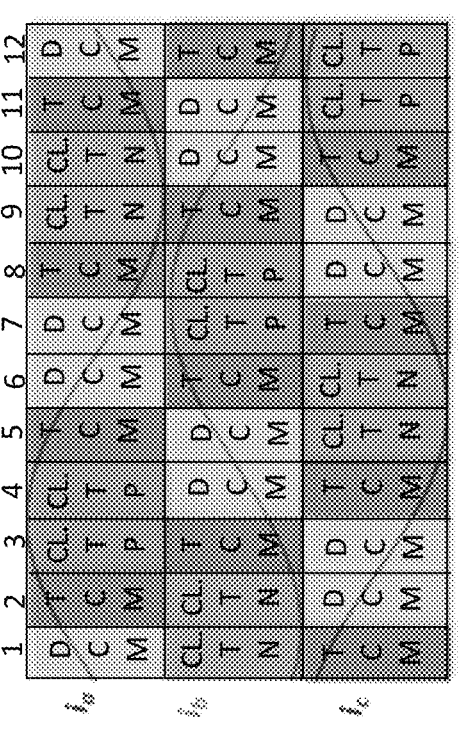
FIG. 13 shows a diagram of the full line cycle control for the first and second switching methods and the corresponding conduction modes.

The phase with the highest current (phase B in Sector I) is still clamped to the negative DC bus point. FIG. 13 shows a diagram of the full line cycle control for both of the switching methods and the corresponding conduction modes. Blocks labeled "DCM" in FIG. 13 correspond to phases that are in DCM mode during a given sector. Blocks labeled "TCM" in FIG. 13 correspond to phases that are in TCM mode during a given sector. Blocks labeled "Cl. T P" in FIG. 13 correspond to phases that are in clamped mode clamped to the positive DC bus point during a given sector. Blocks labeled "Cl. T N" in FIG. 13 correspond to phases that are in clamped mode and clamped to the negative DC bus point during a given sector. The sector numbers are shown at the top of the diagram. For example, during sector 1, phase A is in DCM mode, phase B is clamped to the negative DC bus point and phase C is in TCM mode.

Figure 14:
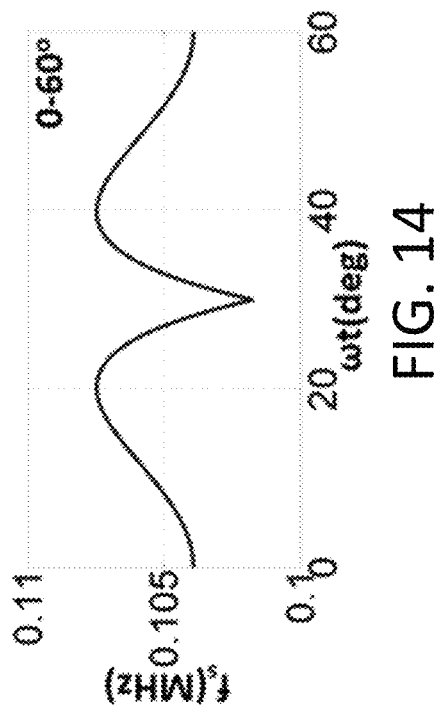
FIG. 14 show the switching frequency as a function of time and indicate that the switching frequency variation for a 900 V $V_{dc}$, 5 kW, 480 V $V_{acll}$ for the first switching method is less than 10%.
Figure 15:
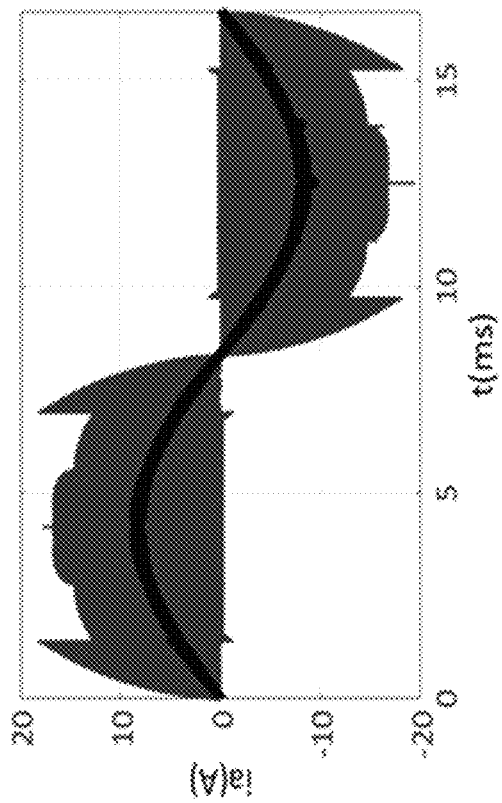
FIG. 15 shows the simulated phase A current as a function of time for the first switching method.
Figure 17:
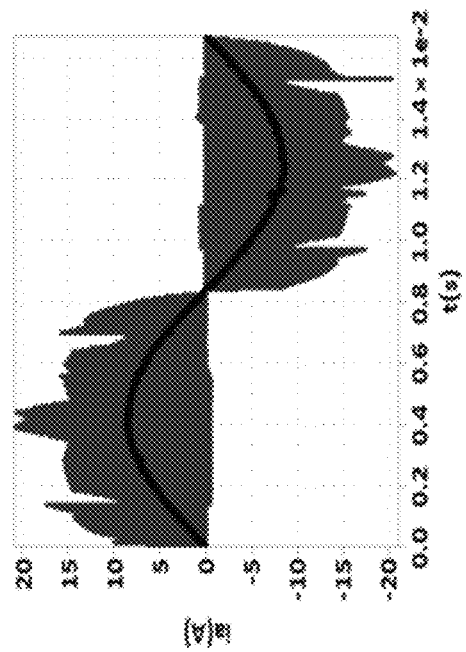
FIG. 17 shows the simulated phase A current as a function of time for the second switching method.
Figure 16:
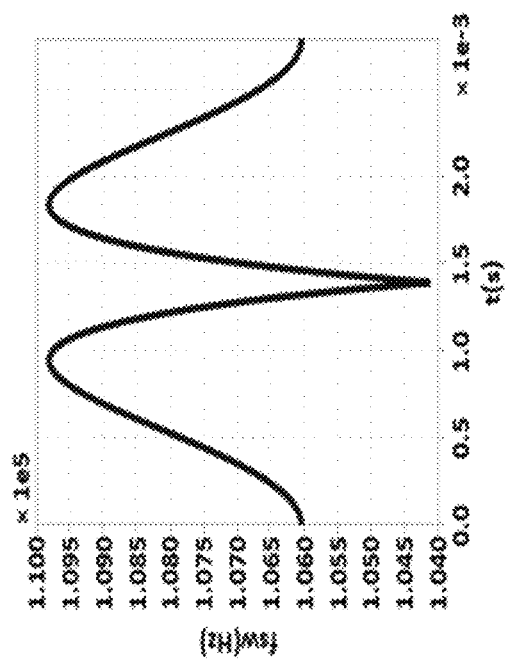
FIG. 16 shows the switching frequency as a function of time and indicate that the switching frequency variation for a 900 V $V_{dc}$, 5 kW, 480 V $V_{acll}$ for the second switching methods is less than 10%.

FIGS. 14 and 16 show the switching frequency as a function of time and indicate that the switching frequency variation for a 900 V $V_{dc}$, 5 kW, 480 V $V_{acll}$ for the first and second switching methods, respectively, is less than 10%. FIGS. 15 and 17 show simulated phase A current as a function of time for the first and second switching methods, respectively. The phase A inductance value is 18 µH. As compared to CCM at 100 kHz, the inductance is reduced to $\frac{1}{10}^{th}$. It is designed to achieve the desired switching frequency. The reduced inductance requirement results in a size reduction of the inductors, which is advantageous because inductors can take up between 40% to 75% total weight or volume.

In order to perform the switching method to achieve the switching states depicted in FIG. 13 in a three-phase, three-level inverter, such as the inverter 100 shown in FIG. 12, for example, a representative embodiment of a simple closed-loop current control scheme is disclosed herein. The closed-loop current control scheme implements a simple conduction-mode decision method that is based on the three-phase symmetry. A new reference domain based on the conduction modes is provided to simplify the closed-loop current control scheme. The closed-loop current control scheme is performed by a current controller that tracks the current reference in the reference domain. For experimental purposes, the current controller has been implemented with a control board with a microcontroller from Texas Instruments, Inc., part number TMS320F28343, and experimentally verified through a prototype 30 kW three-phase, three-level inverter which operates in TCM. Other types of processors or controllers may be used for this purpose. The inventive principles and concepts are not limited with respect to the controller or processor that is used for this purpose, as will be understood by those of skill in the art in view of the description provided herein. For example, other DSP chips that are suitable for this purpose are DSP chips from Texas Instruments, Inc. having part numbers TMS320F28335, TMS320F28346 and TMS320F28377D.

Figure 18B:
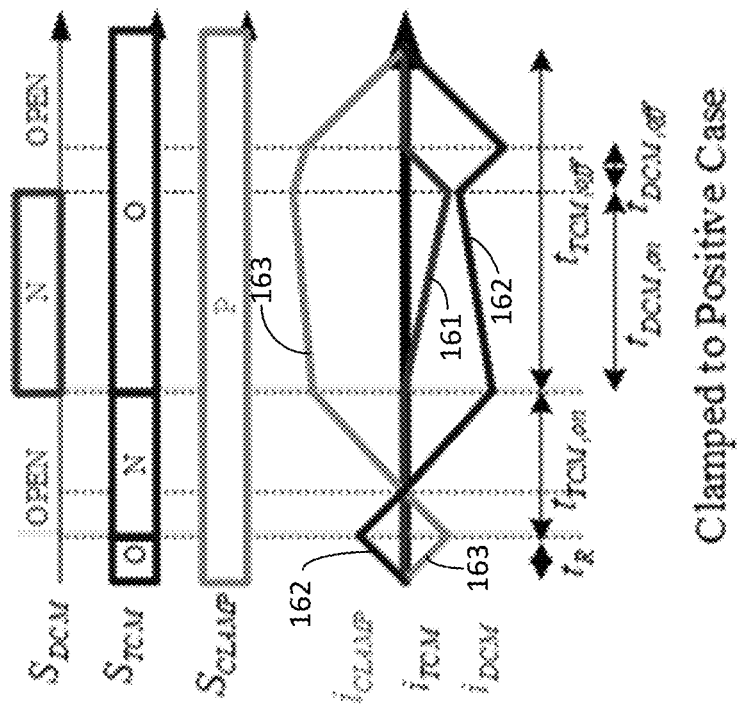
FIGS. 18A and 18B show the switching sequences for twelve different sectors shown in FIG. 13 for negative and positive clamping directions, respectively.
Figure 18A:
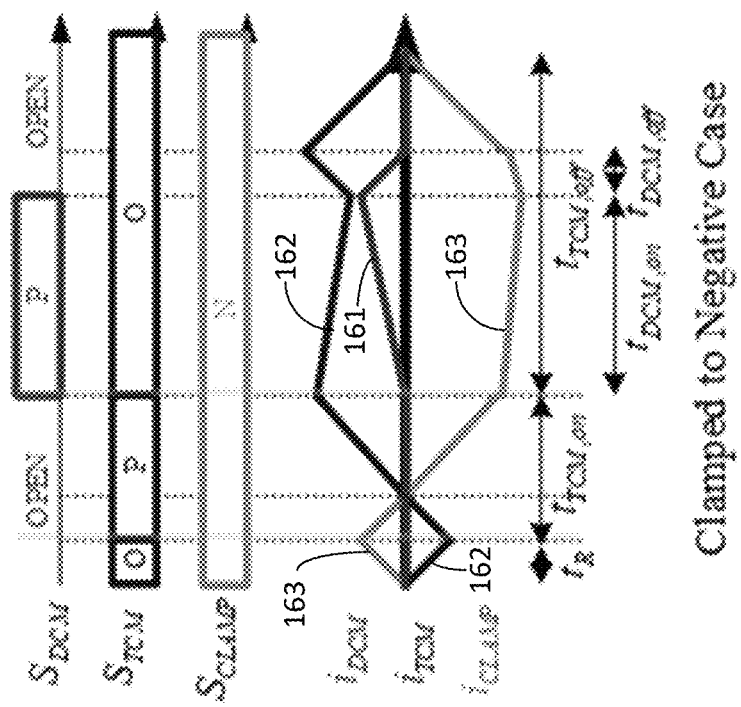

In accordance with a representative embodiment, the closed-loop current control scheme uses the three conduction modes discussed above, namely, clamped, DCM and TCM. For each sector, one of the conduction modes is assigned to each phase in accordance with the switching scheme depicted in FIG. 13. In accordance with this embodiment, there exist two switching sequences depending on the direction of clamping. The first switching sequence for the three-phase, three-level inverter is shown in FIG. 18A and has the B phase clamped to the negative DC bus point. The second switching sequence for the three-phase, three-level inverter is shown in FIG. 18B and has the B phase clamped to the positive DC bus point. It should be noted, however, that the current controller and method is not limited to particular switching sequences or circuit topologies. For example, the current controller and method are suitable for implementation with two-level topologies and are suitable for three-phase, three-level inverters that use other switching sequences.

In FIGS. 18A and 18B, the current plot 161 corresponds to the DCM phase current, $i_{DCM}$, the current plot 162 corresponds to the TCM phase current, $i_{TCM}$, and the current plot 163 corresponds to the clamped phase current, $i_{CLAMP}$. In FIGS. 18A and 18B the variables $t_R$, $t_{TCM,on}$, $t_{TCM,off}$, $t_{DCM,on}$, and $t_{DCM,off}$ represent the amount of time that the reverse current, $i_R$, is allowed to flow to discharge the parasitic capacitor of the transistor to create the ZVS condition, the amount of time that TCM phase is on, the amount of time that TCM phase is off, the amount of time that DCM phase is on, and the amount of time that DCM phase is off, respectively. These timing variables can be equivalent to the timing variables of FIG. 7.

The DCM and TCM phases switch between the open, O, and P states. The on-time for TCM phase ($t_{TCM,on}$) and the on-time for DCM phase ($t_{DCM,on}$) can be controlled for the average current of TCM phase ($i_{TCM}$) and the average current for DCM phase ($i_{DCM}$), respectively. The average current for clamped phase ($i_{CLAMP}$) is automatically determined through the coupling of three phases. An end of switching cycle is determined by a zero-current detection (ZCD) signal from the clamped phase.

Figure 19:
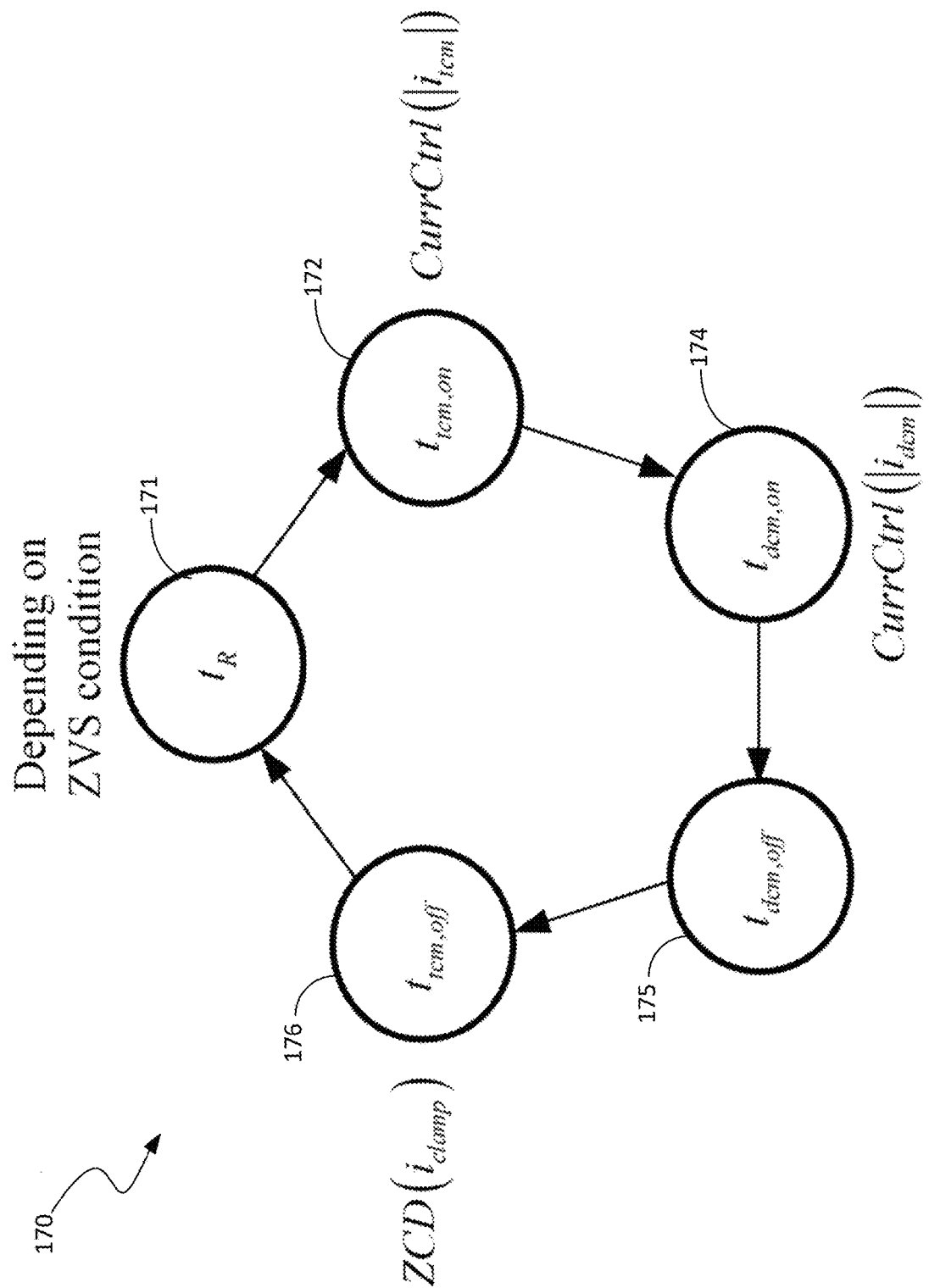
FIG. 19 is a state diagram showing the states of a state machine of a current controller for generating the switching sequence in accordance with a representative embodiment.

FIG. 19 is a state diagram 170 showing the states of a state machine of the current controller for generating the switching sequence. The state machine 170 will also be described with reference to FIG. 18A. In the $t_R$ state 171, a waiting period occurs that is sufficiently long for the reverse current $i_R$ to build to discharge the parasitic capacitance of the TCM phase switches. At the end of time period $t_R$, the state machine enters the $t_{TCM,on}$ state 172. The on time for the TCM phase, $t_{TCM,on}$, is the amount of time needed for the TCM phase current, $i_{TCM}$, to build, as shown in FIG. 18A. At the end of the $t_{TCM,on}$ time period, the state machine exits the TCM phase and enters the $t_{DCM,on}$ state 174. The on time for the DCM phase, $t_{DCM,on}$, is the amount of time needed for the DCM phase current, $i_{DCM}$, to build, as shown in FIG. 18A. At the end of the $t_{DCM,on}$ time period, the state machine exits the DCM phase and enters the $t_{DCM,off}$ state 175. At the end of the $t_{DCM,off}$ time period, the state machine enters the $t_{TCM,off}$ state during which the TCM and DCM phases are off. When a zero-crossing detector (ZCD) detects the zero crossing of all three phases, which is contemporaneous with the clamped current $i_{CLAMP}$ dropping to zero, the state machine re-enters the $t_R$ state 171 and the process repeats except that the conduction modes TCM, DCM and clamped are assigned to different phases depending on the sector.

For example, as shown in FIG. 13, in sector 1, phase A is the DCM phase, phase B is the clamped-to-negative phase and phase C is the TCM phase, but in sector 2, phase A is the TCM phase, phase B is still clamped-to-negative phase and phase C is the DCM phase. Since the switching sequences shown in FIGS. 7 and 18A are the same, the signal gating for sector 1 for the inverter 100 shown in FIG. 12 will be as depicted in FIG. 8 for sector 1, but will be different for sector 2. The manner in which the conduction modes are assigned to the three phases is described below in detail.

Figure 20:
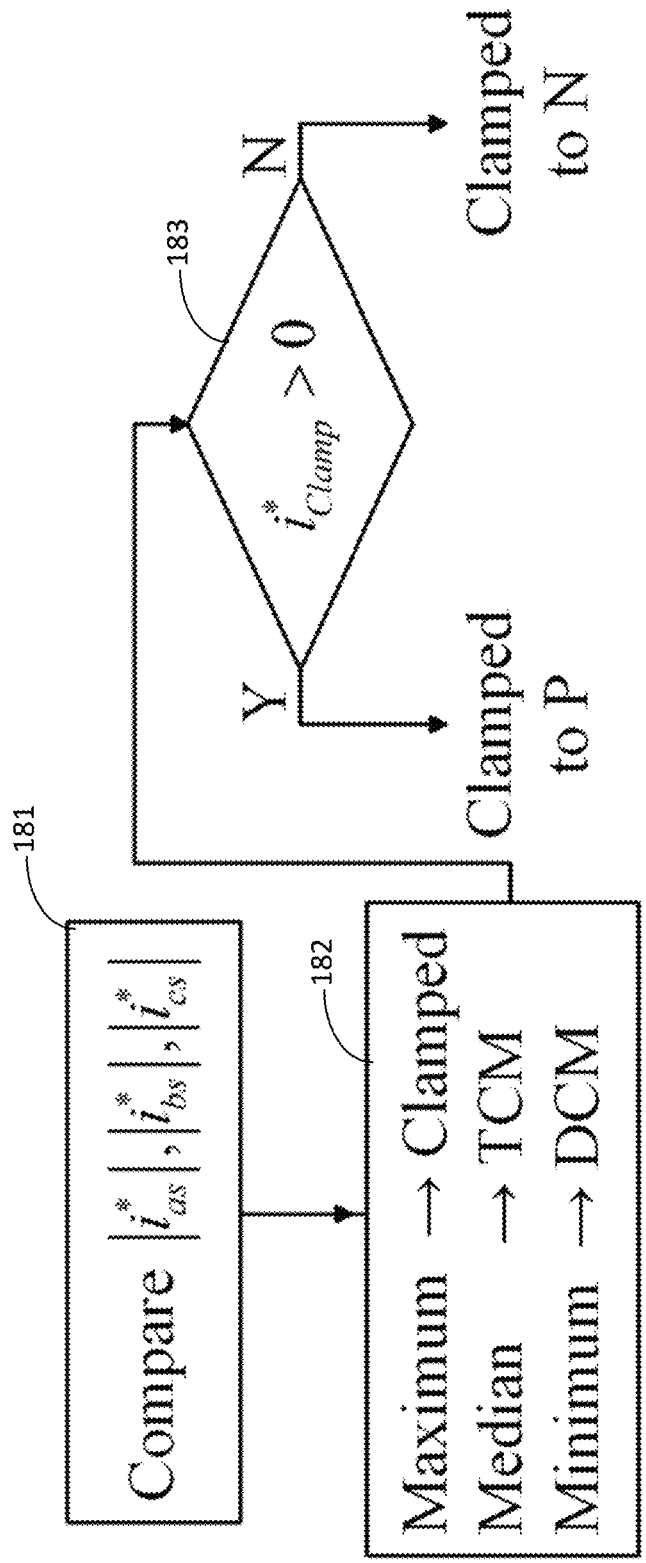
FIG. 20 is a flow diagram depicting the conduction mode decision method used to assign conduction modes to the three phases in accordance with a representative embodiment.

FIG. 20 is a flow diagram depicting the conduction mode decision method used to assign the conduction modes to the three phases. In carrier-based PWM schemes for CCM inverters, maximum, median, and minimum values of the voltage reference ($v_{max}^*$, $v_{med}^*$, $v_{min}^*$) may be used instead of the sectors based on the symmetry of the three-phase system. In accordance with a representative embodiment, the conduction modes for the three-phase, three-level inverter are determined in a similar manner, as will now be described with reference to FIG. 20. The values of $i_{as}^*$, $i_{bs}^*$, $i_{cs}^*$ are compared with one another, as indicated by block 181, and the phase with largest absolute value is designated as the clamped phase, as indicated by block 182. The clamping direction is determined based on the polarity of the current for the clamped phase, as indicated by block 183. The phase with the lowest absolute value is designated to operate in DCM, and the phase with medium value id designated to operate in TCM, as indicated by block 182. Once the conduction-modes and the clamping direction are determined, this information can be transferred to the current controller, which is described below with reference to FIG. 26.

The switching sequences for twelve different sectors shown in FIG. 13 could be classified in two groups depending on the clamping directions, as shown in FIGS. 18A and 18B. From the current slopes shown in FIGS. 18A and 18B, it can be seen that increasing $t_{DCM,on}$ or $t_{TCM,on}$ will increase the absolute value of average currents ($|i_{TCM}|$, $|i_{DCM}|$) regardless of the clamping directions.

FIG. 21 shows the time-domain waveforms $|i_{CLAMP}^*|$, $|i_{TCM}^*|$, and $|i_{DCM}^*|$ for one line-cycle under the unit power factor case. The portions of the waveforms between the lines labeled 191 and 192 correspond to the $|i_{DCM}*|$ waveform. The portions of the waveforms between the lines labeled 192 and 193 correspond to the $|i_{TCM}*|$ waveform. The portions of the waveforms between the lines labeled 193 on each side correspond to the $|i_{CLAMP}*|$ waveform. When the three-phase currents on the abc-frame as shown in FIG. 13 are transformed according to the conduction mode, the time-domain waveforms of $|i_{CLAMP}*|$, $|i_{TCM}*|$, and $|i_{DCM}*|$ are as depicted in FIG. 21 for one line-cycle under the unit power factor case. It can be seen in FIG. 21 that the waveforms of $|i_{TCM}*|$ and $|i_{DCM}*|$ become similar to a ramp input within one sector. If $t_{TCM,on}$ and $t_{DCM,on}$ can be controlled to follow such references on the domain disclosed herein, the closed-loop control for three-phase current will be achieved. Small signal gains $\Delta|i_{TCM}*|/\Delta t_{TCM,on}$ and $\Delta|i_{DCM}*|/\Delta t_{DCM,on}$ vary within the 30° sector according to the grid voltage and are as shown in FIGS. 22 and 23, respectively, when the modulation index (MI) is near 0.866 and the inverter operates in unity power factor. Along with the variation of the line voltage, the small signal gains show significant variation in their magnitudes. It should be noted that if symmetry of three-phases is assumed, these gains will be identical along the sectors.

Thus, the architecture of the current controller should be such that the time periods $t_{TCM,on}$ and $t_{DCM,on}$ have durations that cause the waveforms pf $|i_{TCM}*|$ and $|i_{DCM}*|$ to follow the proposed domain. There exist three issues that need to be resolved to synthesize the three-phase currents in the proposed reference frame. Firstly, as indicated above, the shape of $|i_{TCM}*|$ and $|i_{DCM}*|$ are nearly ramp. Secondly, there exists a mode transition every 30°. Lastly, a large variation in the gain is present according to the line voltage variation, as shown in FIGS. 22 and 23. The current controller architecture resolves all three of these issues.

Figures 24, 25:
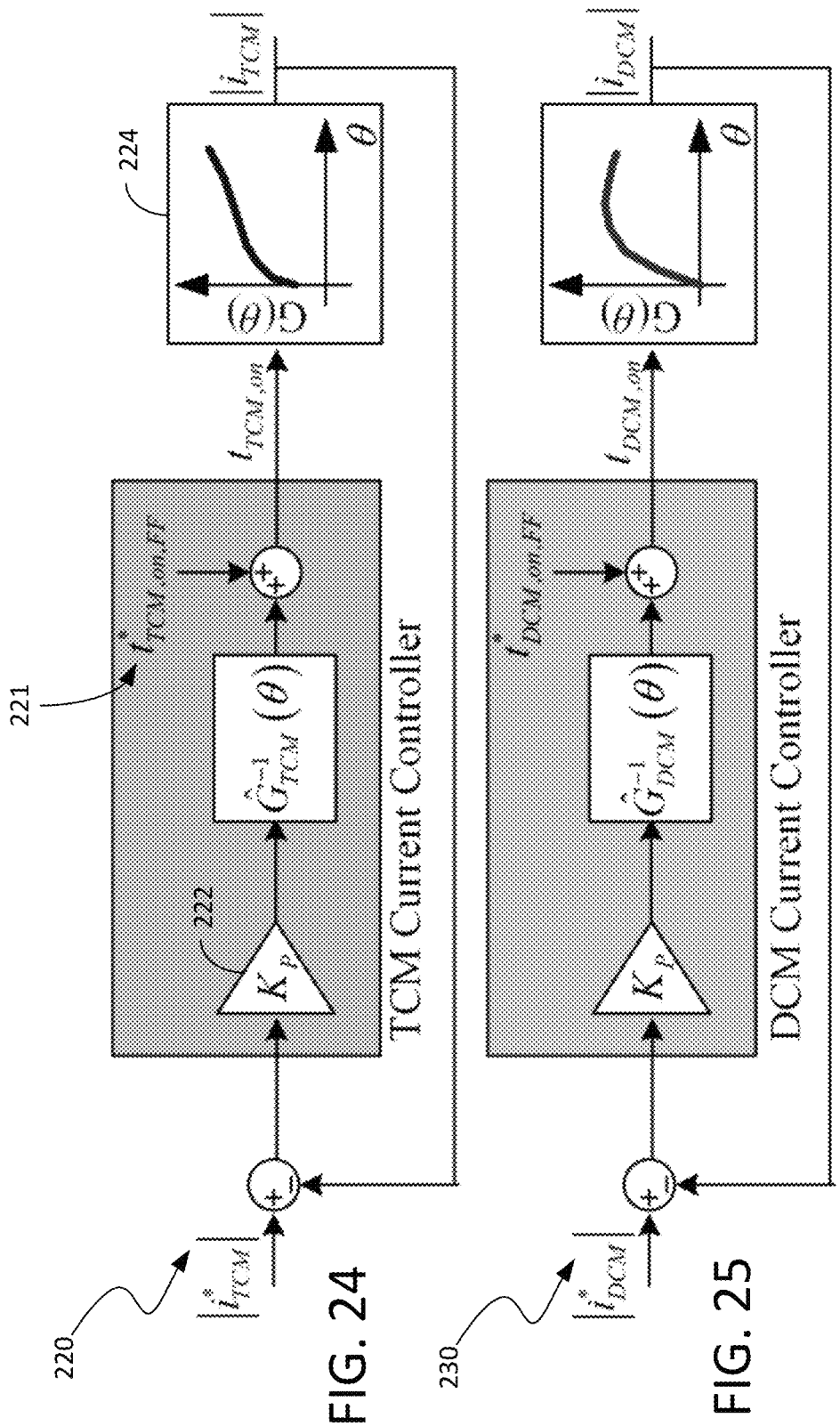
FIG. 24 is a block diagram of a TCM current control block in accordance with a representative embodiment.
FIG. 25 is a block diagram of a DCM current control block in accordance with a representative embodiment.

FIGS. 24 and 25 are block diagrams of a TCM current control block 220 and of a DCM current control block 230. The TCM and DCM current control blocks 220 and 230, respectively, ensure that the time periods $t_{TCM,on}$ and $t_{DCM,on}$ have durations that cause the waveforms pf $|_{TCM}*|$ and $|_{DCM}*|$ to follow the proposed domain despite these gain variations. The TCM and DCM current controllers 220 and 230, respectively, have the same architecture, which comprises three parts. Therefore, only the TCM current controller 220 will be described. Firstly, a feedforward term 221, which can be calculated based on the modeling. Secondly, a proportional gain KP 222. A combination of proportional gain KP and integrator is widely used as a proportional integral (PI) controller. However, in accordance with this representative embodiment, the integrator is not included to avoid possible distortions at the sector change instant. Lastly, the variation of the plant gain is pre-calculated and compensated by gain compensator 224.

To verify the proposed switching sequence and its control via the current controller, an experimental setup of a 30 kW, three-phase, three-level PV inverter was built. The input grid to the inverter is 480 V and the dc-link voltage is 850 V. The inverter operates near 140 kHz. The output filter inductor is 9 pH. The inverter comprises three inverters of the type shown in FIG. 12 interleaved to cancel the high current ripple by the TCM operation.

Figure 26:
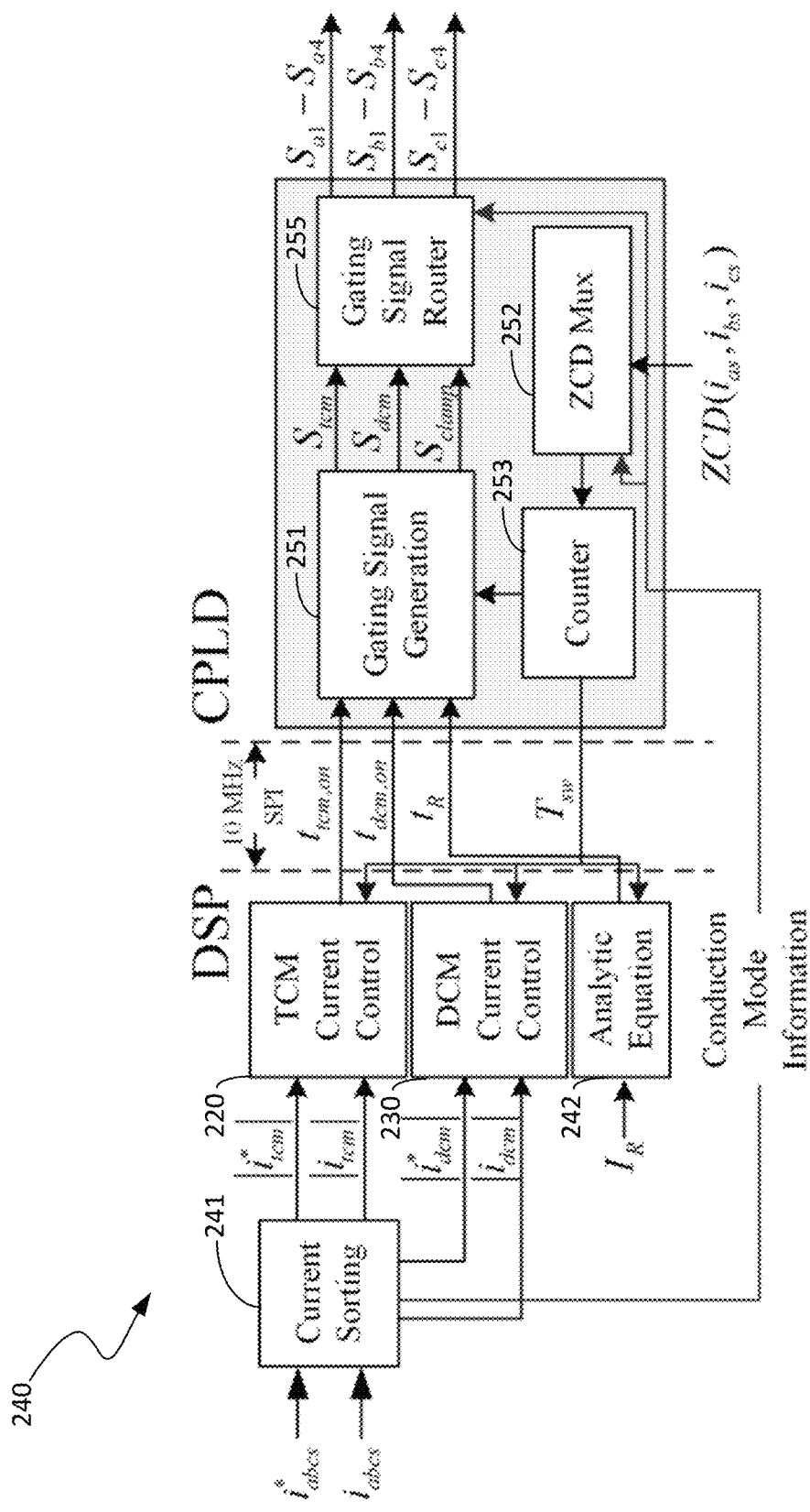
FIG. 26 is a block diagram of a current controller in accordance with a representative embodiment.

FIG. 26 is a schematic block diagram of the current controller 240 in accordance with a representative embodiment for controlling the three-phase, three-level inverter of the experimental setup. A current sorting block 241 of the current controller 240 comprises logic configured to perform the operations described above with reference to the flow diagram of FIG. 20 to determine which of phases A, B and C are to be TCM phase, the DCM phase and the clamped phase for the given sector and the polarity of the clamped phase. The current sorting block 241 outputs the time domain waveforms $|i_{TCM}*|$ and $|_{DCM}*|$ shown in FIG. 21 to the TCM and DCM current control blocks 220 and 230, respectively, of the current controller 240. The current control blocks 220 and 230 preferably have logic configurations that are as shown in FIGS. 24 and 25, respectively, and described above. The current sorting block 241 also outputs the absolute values of the average TCM and DCM currents ($|_{TCM}|$ and $|_{DCM}|$) to the TCM and DCM current control blocks 220 and 230, respectively, of the current controller 240.

An analytical equation block 242 comprises logic configured to process the reverse current $I_R$ to determine the extended turn-off time period for the TCM phase needed for the required reverse current $I_R$ to achieve ZVS. The time periods $t_{TCM,on}$, $t_{DCM,off}$ and $t_R$ are output from the blocks 220, 230 and 242, respectively, to a gating signal generation block 251.

The gating signal generation block 251 comprises logic configured to process the time periods $t_{TCM,on}$, $t_{DCM,off}$ and $t_R$ and generate the gating signals (FIGS. 8 and 11) based on those time periods, to cause the switches 101a-101l of the inverter 100 (FIG. 12) to be placed in the proper states during each sector to achieve the proper conduction modes for each phase, as shown in FIG. 13.

A zero-crossing detector (ZCD) multiplexer (MUX) 252 receives the output of a ZCD (not shown) that indicates when the three phases cross, which indicates the end of a single switching cycle. The ZCD MUX 252 also receives conduction mode information sent from the current sorting block 241. The ZCD signals from three phases are muxed by the ZCD MUX 252 based on the conduction mode information and used to trigger a reset of the counter 253. Based on the count delivered to the gating signal generation block 251, block 251 outputs the switching states for three conduction-modes, $S_{DCM}$, $S_{TCM}$ and $S_{CLAMP}$, for the three phases, as shown in FIGS. 18A and 18B. The counter 253 also delivers a timing signal, $T_{sw}$, to blocks 220, 230 and 242 that synchronizes the operations of those blocks with the operations of the gating signal generation block 251.

A gating signal router block 255 has logic configured to route the gating signals to the respective switches 101a-101l based on the conduction mode switching states, $S_{DCM}$, $S_{TCM}$ and $S_{CLAMP}$, received from the gating signal generation block 251 and based on the conduction mode information received from the current sorting block 241. The conduction mode information associates each of the three phases corresponds with one of the conduction modes. Based on this information, the gating signal router block 255 knows which state each of the switches 101a-101l is to be placed in over the course of the current sector and routes the switching signals $S_{a1}$-$S_{a4}$, $S_{b1}$-$S_{b4}$ and $S_{c1}$-$S_{c4}$ to the respective switches 101a-101l.

The current controller 240 may be implemented in a variety of ways. In accordance with a representative embodiment, blocks 220, 230, 241 and 242 are implemented in a digital signal processor (DSP) and blocks 251, 252, 253 and 255 are implemented in a complex programmable logic device (CPLD). In accordance with this embodiment, the DSP calculates all the timing information and transfers it to the CPLD through serial peripheral interface (SPI) communication. For the experimental setup, a TMS320F28343 DSP from Texas Instruments was used. The CPLD has the state machine represented by the state diagram 170 shown in FIG.

19 that generates the gating signals. From CPLD, the latest switching period information is sent back to DSP.

Figure 27A:
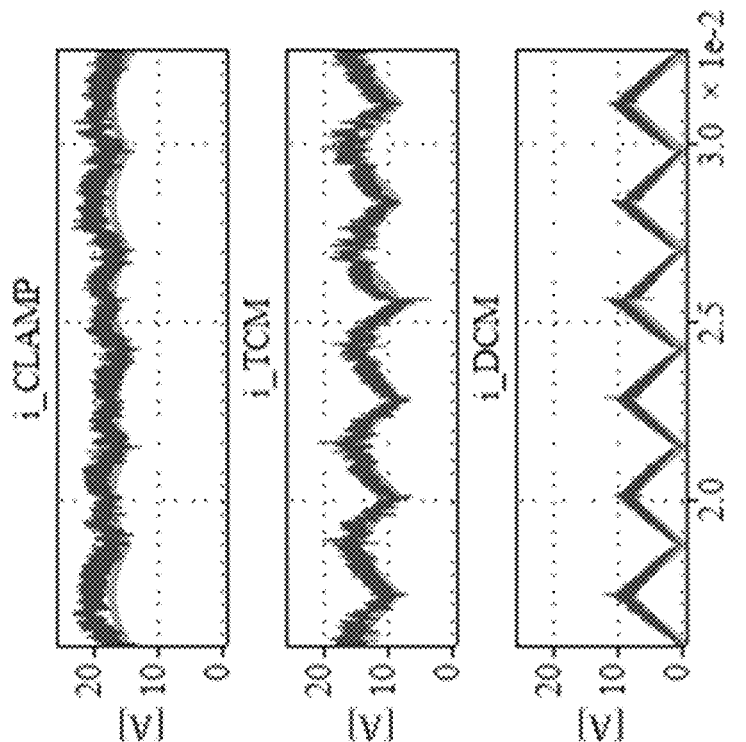
FIG. 27A shows the output three-phase current waveforms of the three-phase, three-level inverter and their filtered waveforms through a 5 kHz low pass filter in accordance with a representative embodiment.
Figure 27B:
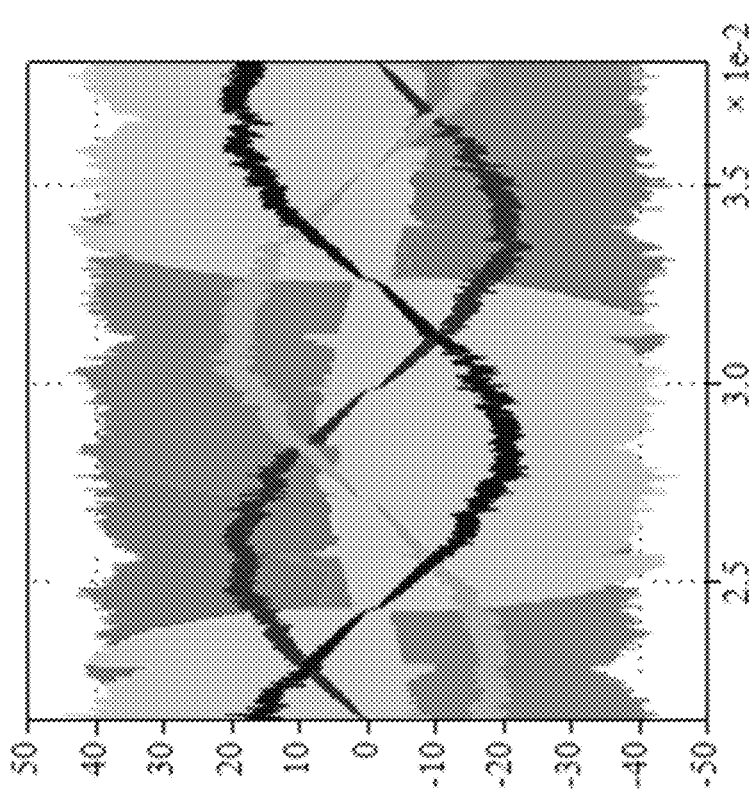
FIG. 27B shows the tracking performance of the current waveforms $i_{CLAMP}$, $i_{TCM}$ and $i_{DCM}$ on the reference frame shown in FIG. 21.

The output three-phase currents waveform of the three-phase, three-level inverter after being filtered through a 5 kHz low pass filter is shown in FIG. 27A. The waveform is low pass filtered at 5 kHz to allow its average values to be observed. With the architecture of the current controller 240 shown in FIG. 26, the three-phase sinusoidal current can be synthesized without any look-up-table and the THD of low-pass filtered waveform is 7%. This value is expected to be lower with presence of ripple cancellation when the inverters are interleaved (typically three of the inverters 100 shown in FIG. 12 are interleaved). FIG. 27B shows the tracking performance of the current waveforms $i_{CLAMP}$, $i_{TCM}$ and $i_{DCM}$ on the reference frame discussed above with reference to FIG. 21. It can be seen that the average component of $i_{TCM}$ and $i_{DCM}$ follows the reference well.

Figure 28:
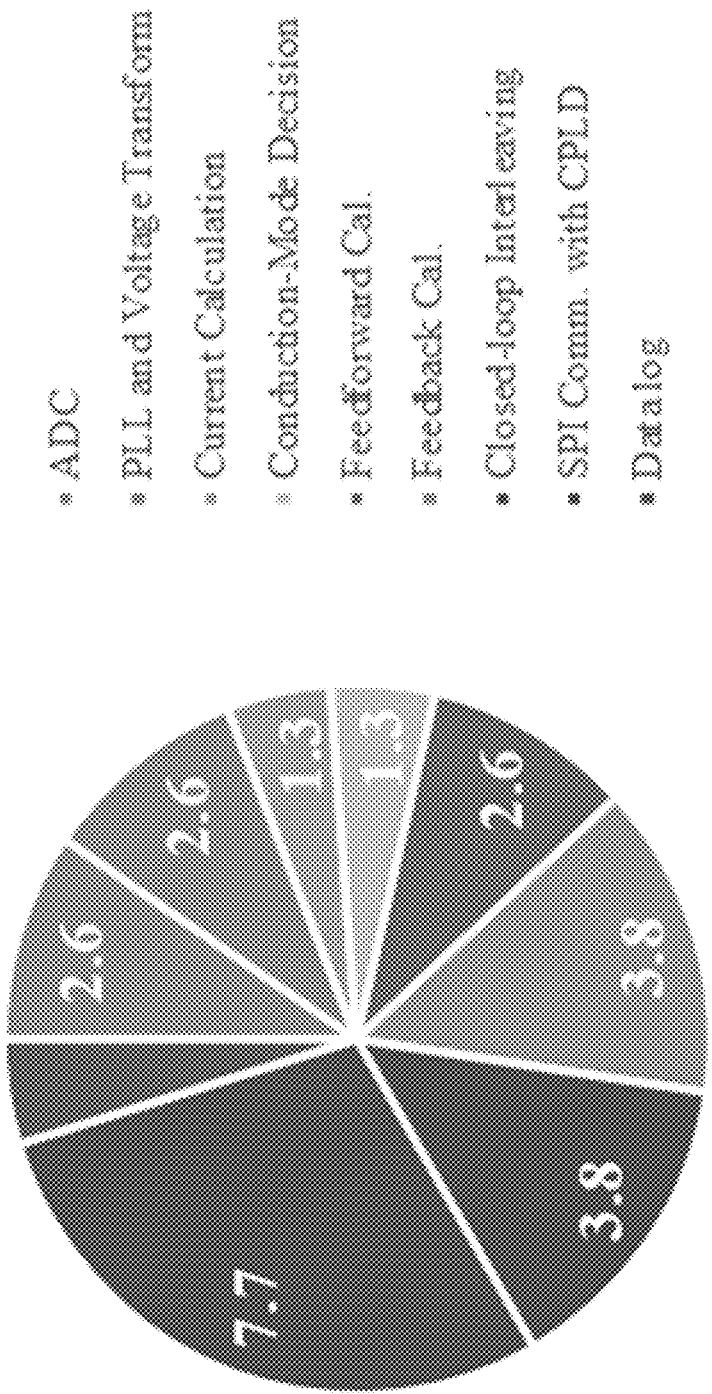
FIG. 28 is a pie chart showing the distribution of calculation time among the various tasks performed by the current controller shown in FIG. 26 in accordance with a representative embodiment.

FIG. 28 is a pie chart showing the distribution of calculation time among the various tasks performed by the TMS320F28343 DSP. With the relatively simple control architecture shown in FIG. 26, total calculation time is 27 μs with 200 MHz clock of the DSP and a quarter of the time is used for SPI communication to transfer five variables with DSP. Thus, the closed-loop control of three-phase current can be easily implemented under the presence of three-phase coupling through the relatively simple control architecture of the current controller 240 shown in FIG. 26. Of course, the current controller 240 is not limited to the control architecture shown in FIG. 26, as will be understood by those of skill in the art in view of the description provided herein. It should also be noted that the current controller 240 is not limited to being used with the three-phase, three-level inverter 100 shown in FIG. 12. For example, FIG. 1 shows a three-phase, three-level inverter 2 having a topology that is different from the topology of the inverter 100 shown in FIG. 12. The topology shown in FIG. 12 is known as a three-phase, three-level NPC inverter topology whereas the topology shown in FIG. 1 is known as a three-phase, three-level T-type inverter topology. Like the inverter 100 shown in FIG. 12, the inverter 270 has twelve switches $S_{A1}$-$S_{A4}$, $S_{B1}$-$S_{B4}$ and $S_{C1}$-$S_{C4}$, but does not include the six diodes 105a-105f shown in FIG. 12.

The current controller 240 may be used with these and other types of three-phase, three-level inverter topologies to achieve all of the benefits described above, e.g., ZVS, phase synchronization, low CMV, sinusoidal average currents, etc. Additionally, the current controller 240 may be used with various types of three-phase, two-level inverter topologies to achieve the same benefits. For example, the current controller 240 may be used to control the three-phase, two-level inverter 4 shown in FIG. 4A.

It should be noted that the illustrative embodiments have been described with reference to a few embodiments for the purpose of demonstrating the principles and concepts of the invention. Persons of skill in the art will understand how the principles and concepts of the invention can be applied to other embodiments not explicitly described herein. For example, while a particular configuration of the current controller is described herein and shown in the figures, a variety of other configurations may be used. Also, the types of inverters with which the current controller may be used is not limited to the inverter configurations explicitly disclosed herein. As will be understood by those skilled in the art in view of the description provided herein, many modifications may be made to the embodiments described herein while still achieving the goals of the invention, and all such modifications are within the scope of the invention.

What is claimed is:

1. A three-phase, N-level inverter, where N is a positive integer that is greater than or equal to two, the three-phase, N-level inverter comprising:
    a three-phase, N-level inverter circuit topology comprising:
        first, second and third sets of switches, each switch comprising at least first, second and third terminals, the first terminals being control terminals; and
        first, second and third inductors, each inductor comprising at least first and second terminals, the first terminals of the first, second and third inductors being electrically coupled to the first, second and third sets of switches, respectively;
    and
    a current controller electrically coupled to the control terminals of the switches, the current controller being configured to perform a control algorithm that causes the current controller to output first, second and third sets of gating signals to the control terminals of the switches of the first, second and third sets of switches, respectively, to cause the switches to be placed in an on state or an off state in a particular sequence to perform zero voltage switching of the switches while maintaining synchronization of the three phases of the three-phase, N-level inverter, wherein the particular sequence is such that each of the three phases is placed in at least three conduction modes of a set of conduction modes during each sector of a plurality of sectors that comprise a switching cycle, the set of conduction modes comprising at least a discontinuous conduction mode (DCM), a triangular current conduction mode (TCM), a clamped-to-positive conduction mode (Cl. T P) and a clamped-to-negative conduction mode (Cl. T N).

2. The three-phase, N-level inverter of claim 1, wherein N is greater than or equal to three.

3. The three-phase, N-level inverter of claim 2, wherein the particular sequence is such that the switches electrically connect the first terminals of the first, second and third inductors to one of a positive (P) side of a direct current (DC) bus of the three-phase, N-level inverter, a negative (N) side of the DC bus, and a mid-point (O) of the DC bus, and wherein the particular sequence is such that the first terminals of the first, second and third inductors are never all simultaneously electrically connected by the switches to the P side of the DC bus or to the N side of the DC bus.

4. The three-phase, N-level inverter of claim 3, wherein the three-phase, N-level inverter circuit topology is a neutral point clamped (NPC) circuit topology.

5. The three-phase, N-level inverter of claim 3, wherein the three-phase, N-level inverter circuit topology is a T-type circuit topology.

6. A method for controlling switching of a three-phase, N-level inverter, where N is a positive integer that is greater than or equal to two, the method comprising:
    with a current controller, performing a control algorithm that controls switching of a plurality of switches of a three-phase, N-level inverter circuit topology comprising first, second and third sets of switches and first, second and third inductors, each switch comprising at least first, second and third terminals, the first terminals being control terminals, each inductor comprising at least first and second terminals, the first terminals of the first, second and third inductors being electrically coupled to the first, second and third sets of switches, respectively, the current controller being electrically coupled to the control terminals of the switches; and with the current controller performing the control algorithm, outputting first, second and third sets of gating signals to the control terminals of the switches of the first, second and third sets of switches, respectively, to cause the switches to be placed in an on state or an off state in a particular sequence to perform zero voltage switching of the switches while maintaining synchronization of the three phases of the three-phase, N-level inverter wherein the particular sequence is such that each of the three phases is placed in at least three conduction modes of a set of conduction modes during each sector of a plurality of sectors that comprise a switching cycle, the set of conduction modes comprising at least a discontinous conduction mode (DCM), a triangular current conduction mode (TCM), a clamped-to-positive conduction mode (Cl. T P) and a clamped-to-negative conduction mode (Cl. T N).

7. The method of claim 6, wherein N is equal to three.

8. The method of claim 7, wherein the particular sequence is such that the switches electrically connect the first terminals of the first, second and third inductors to one of a positive (P) side of a direct current (DC) bus of the three-phase, three-level inverter, a negative (N) side of the DC bus, and a mid-point (O) of the DC bus, and wherein the particular sequence is such that the first terminals of the first, second and third inductors are never all simultaneously electrically connected by the switches to the P side of the DC bus or to the N side of the DC bus.

9. The method of claim 8, wherein the three-phase, three-level inverter circuit topology is a neutral point clamped (NPC) circuit topology.

10. The method of claim 8, wherein the three-phase, three-level inverter circuit topology is a T-type circuit topology.

11. A computer program comprising instructions embedded on a non-transitory computer-readable medium, instructions controlling a current controller of a three-phase, N-level inverter, where N is a positive integer that is greater than or equal to two, the program comprising:
a first code segment that determines which of a plurality of conduction modes to place each of the three phases in based on a comparison of values of first, second and third currents associated with first, second and third phases, respectively, of the three-phase, N-level inverter and based on a polarity of a clamped phase current, three-phase, N-level inverter having a circuit topology comprising first, second and third sets of said switches and first, second and third inductors, each switch comprising at least first, second and third terminals, the first terminals of the switches being control terminals, each inductor comprising at least first and second terminals, the first terminals of the first, second and third inductors being electrically coupled to the first, second and third sets of switches, respectively, the current controller being electrically coupled to the control terminals of the switches; and
a second code segment that causes first, second and third sets of gating signals to be sent to the control terminals of the switches of the first, second and third sets of switches, respectively, to cause the switches to be placed in an on state or an off state in a particular sequence to perform zero voltage switching of the switches while maintaining synchronization of the three phases of the three-phase, N-level inverter, wherein the particular sequence is such that each of the three phases is placed in at least three conduction modes of a set of conduction modes during each sector of a plurality of sectors that comprise a switching cycle, the set of conduction modes comprising at least a discontinous conduction mode (DCM), a triangular current conduction mode (TCM), a clamped-to-positive conduction mode (Cl. T P) and a clamped-to-negative conduction mode (Cl. T N).

12. The computer program of claim 11, wherein N is equal to three, and wherein the particular sequence is such that the switches electrically connect the first terminals of the first, second and third inductors to one of a positive (P) side of a direct current (DC) bus of the three-phase, N-level inverter, a negative (N) side of the DC bus, and a mid-point (O) of the DC bus, and wherein the particular sequence is such that the first terminals of the first, second and third inductors are never all simultaneously electrically connected by the switches to the P side of the DC bus or to the N side of the DC bus.

13. The computer program of claim 11, wherein N is greater than or equal to three.

14. The computer program of claim 11, wherein the three-phase, N-level inverter circuit topology is one of a neutral point clamped (NPC) circuit topology and a T-type circuit topology.

15. A three-phase, N-level inverter, where N is a positive integer that is greater than or equal to two, the three-phase, N-level inverter comprising:
a three-phase, N-level inverter circuit topology comprising:
first, second and third sets of switches, each main switch comprising at least first, second and third terminals, the first terminals being control terminals; and
first, second and third inductors, each inductor comprising at least first and second terminals, the first terminals of the first, second and third inductors being electrically coupled to the first, second and third sets of switches, respectively;
and
a current controller electrically coupled to the control terminals of the switches, the current controller being configured to perform a control algorithm that causes the current controller to output first, second and third sets of gating signals to the control terminals of the switches of the first, second and third sets of switches, respectively, to cause the switches to be placed in an on state or an off state in a particular sequence to perform zero voltage switching of the switches while maintaining synchronization of the three phases, N-level inverter, the particular sequence causing the switches to electrically connect the first terminals of the first, second and third inductors to one of a positive (P) side of a direct current (DC) bus of the three-phase, N-level inverter, a negative (N) side of the DC bus, and a mid-point (O) of the DC bus, and wherein the particular sequence is such that the first terminals of the first, second and third inductors are never all simultaneously electrically connected by the switches to the P side of the DC bus or to the N side of the DC bus.

16. The three-phase, N-level inverter of claim 15, wherein the three-phase, N-level inverter has a maximum common mode voltage (CMV) of $V_{DC}/3$, where $V_{DC}$ is a direct current (DC) input voltage of the three-phase, three-level inverter.

17. The three-phase, N-level inverter of claim 15, wherein the three-phase, N-level inverter circuit topology is a neutral point clamped (NPC) circuit topology.

18. The three-phase, N-level inverter of claim 15, wherein the three-phase, N-level inverter circuit topology is a T-type circuit topology.

19. The three-phase, N-level inverter of claim 15, wherein the particular sequence is such that each of the three phases is placed in at least three conduction modes of a set of conduction modes during each sector of a plurality of sectors that comprise a switching cycle, the set of conduction modes comprising at least a discontinuous conduction mode (DCM), a triangular current conduction mode (TCM), a clamped-to-positive conduction mode (Cl. T P) and a clamped-to-negative conduction mode (Cl. T N) during each sector of a plurality of sectors that comprise a switching cycle.

20. The three-phase, N-level inverter of claim 15, wherein the particular sequence is such that each of the three is placed in at least three conduction modes of a set of conduction modes during each sector of a plurality of sectors that comprise a switching cycle, the set of conduction modes comprising at least a discontinuous conduction mode (DCM), a triangular current conduction mode (TCM), a clamped-to-positive conduction mode (Cl. T P) and a clamped-to-negative conduction mode (Cl. T N) during each sector of a plurality of sectors that comprise a switching cycle.

21. A method for controlling switching of a three-phase, N-level inverter, where N is a positive integer that is greater than or equal to two, the method comprising:

with a current controller, performing a control algorithm that controls switching of a plurality of switches of a three-phase, N-level inverter circuit topology comprising first, second and third sets of switches and first, second and third inductors, each switch comprising at least first, second and third terminals, the first terminals being control terminals, each inductor comprising at least first and second terminals, the first terminals of the first, second and third inductors being electrically coupled to the first, second and third sets of switches, respectively, the current controller being electrically coupled to the control terminals of the switches; and with the current controller performing the control algorithm, outputting first, second and third sets of gating signals to the control terminals of the switches of the first, second and third sets of switches, respectively, to cause the switches to be placed in an on state or an off state in a particular sequence to perform zero voltage switching of the switches while maintaining synchronization of the three phases of the three-phase, N-level inverter, wherein the particular sequence is such that the switches electrically connect the first terminals of the first, second and third inductors to one of a positive (P) side of a direct current (DC) bus of the three-phase, N-level inverter, a negative (N) side of the DC bus, and a mid-point (O) of the DC bus, and wherein the particular sequence is such that the first terminals of the first, second and third inductors are never all simultaneously electrically connected by the switches to the P side of the DC bus or to the N side of the DC bus.

22. The method of claim 21, wherein the three-phase, N-level inverter has a maximum common mode voltage (CMV) of $V_{DC}/3$, where $V_{DC}$ is a direct current (DC) input voltage of the three-phase, three-level inverter.

23. The method of claim 21, wherein the three-phase, N-level inverter has a maximum common mode voltage (CMV) of $V_{DC}/3$, where $V_{DC}$ is a direct current (DC) input voltage of the three-phase, three-level inverter.

24. The method of claim 21, wherein the three-phase, N-level inverter circuit topology is a neutral point clamped (NPC) circuit topology.

25. The method of claim 21, wherein the three-phase, N-level inverter circuit topology is a T-type circuit topology.

26. The method of claim 21, wherein the particular sequence is such that each of the three phases is placed in at least three conduction modes of a set of conduction modes during each sector of a plurality of sectors that comprise a switching cycle, the set of conduction modes comprising at least a discontinuous conduction mode (DCM), a triangular current conduction mode (TCM), a clamped-to-positive conduction mode (Cl. T P) and a clamped-to-negative conduction mode (Cl. T N) during each sector of a plurality of sectors that comprise a switching cycle.

27. The method of claim 21, wherein the particular sequence is such that each of the three phases is placed in at least three conduction modes of a set of conduction modes during each sector of a plurality of sectors that comprise a switching cycle, the set of conduction modes comprising at least a discontinuous conduction mode (DCM), a triangular current conduction mode (TCM), a clamped-to-positive conduction mode (Cl. T P) and a clamped-to-negative conduction mode (Cl. T N) during each sector of a plurality of sectors that comprise a switching cycle.

* * * * *